(12) United States Patent
Moran et al.

(10) Patent No.: US 9,841,762 B2
(45) Date of Patent: *Dec. 12, 2017

(54) ALERTING PREDICTED ACCIDENTS BETWEEN DRIVERLESS CARS

(71) Applicants: Dov Moran, Kfar-Saba (IL); Menahem Lasser, Kohav-Yair (IL)

(72) Inventors: Dov Moran, Kfar-Saba (IL); Menahem Lasser, Kohav-Yair (IL)

(73) Assignee: COMIGO LTD., Yarkona (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/464,015

(22) Filed: Mar. 20, 2017

(65) Prior Publication Data

US 2017/0248949 A1 Aug. 31, 2017

Related U.S. Application Data

(63) Continuation-in-part of application No. 15/165,668, filed on May 26, 2016, now Pat. No. 9,598,078, and (Continued)

(51) Int. Cl.
*G08G 1/16* (2006.01)
*G05D 1/00* (2006.01)
(Continued)

(52) U.S. Cl.
CPC ........... *G05D 1/0055* (2013.01); *B60W 30/09* (2013.01); *B60W 30/0956* (2013.01);
(Continued)

(58) Field of Classification Search
None
See application file for complete search history.

(56) References Cited

U.S. PATENT DOCUMENTS 6,765,495 B1 * 7/2004 Dunning ................ G08G 1/161
340/435
7,102,496 B1 * 9/2006 Ernst, Jr. .......... G08G 1/096725
180/167

(Continued)

FOREIGN PATENT DOCUMENTS

KR 10-2013-0134915 A 12/2013

OTHER PUBLICATIONS

International Search Report for PCT/IB2016/053102 dated Aug. 25, 2016.

(Continued)

*Primary Examiner* — Redhwan K Mawari
*Assistant Examiner* — Edward Torchinsky
(74) *Attorney, Agent, or Firm* — Marc Van Dyke; Fourth Dimension IP

(57) ABSTRACT

This patent application discloses methods and systems for alerting computerized motor-vehicles about predicted accidents. In an example method, a motor vehicle alerts another motor vehicle about a predicted accident, even though that accident is between the alerting car and a third motor vehicle—for example, the alert is transmitted by non-visual electromagnetic (EM) radiation. When an adjacent motor vehicle receives such accident alert and determines it might itself be hit, it will react so as to minimize its chances of being hit or at least to minimize the damage if it is being hit. Optionally, one or more of the motor vehicles has an onboard device for measuring a blood-alcohol level of a human driver thereof. The measured blood-alcohol level may be used to compute a probability of an occurrence of an accident and/or may be included in one or more of the transmitted accident alerts.

12 Claims, 28 Drawing Sheets

Related U.S. Application Data a continuation-in-part of application No. PCT/IB2016/053102, filed on May 26, 2016.

(60) Provisional application No. 62/166,795, filed on May 27, 2015.

(51) Int. Cl.
| | | |
|---|---|---|
| *G05D 1/02* | (2006.01) | |
| *B60W 30/095* | (2012.01) | |
| *B60W 30/09* | (2012.01) | |
| *H04W 84/00* | (2009.01) | |

(52) U.S. Cl.
CPC ......... *G05D 1/0022* (2013.01); *G05D 1/0276* (2013.01); *G08G 1/165* (2013.01); *G08G 1/166* (2013.01); *H04W 84/005* (2013.01)

(56) References Cited

U.S. PATENT DOCUMENTS

| | | | | |
|---|---|---|---|---|
| 7,304,589 B2* | 12/2007 | Kagawa | ............... | G08G 1/0965 340/995.1 |
| 7,315,239 B2* | 1/2008 | Cheng | ............... | B60W 40/04 340/436 |
| 7,782,227 B2* | 8/2010 | Boss | ............... | G08G 1/162 340/902 |
| 8,630,772 B2* | 1/2014 | Ieda | ............... | B60R 21/0134 280/735 |
| 9,159,237 B2* | 10/2015 | Huang | ............... | G08G 1/166 |
| 2003/0141966 A1 | 7/2003 | Strumolo et al. | | |
| 2010/0256852 A1* | 10/2010 | Mudalige | ............... | G08G 1/163 701/24 |
| 2011/0295467 A1 | 12/2011 | Browne et al. | | |
| 2012/0229301 A1 | 9/2012 | Goodwin | | |
| 2012/0259538 A1 | 10/2012 | Oexmann | | |
| 2015/0161894 A1* | 6/2015 | Duncan | ............... | G08G 1/163 701/1 |
| 2016/0018228 A1* | 1/2016 | Parker | ............... | G01C 21/3623 701/412 |
| 2017/0248950 A1 | 8/2017 | Moran et al. | | |

OTHER PUBLICATIONS

Written Opinion for PCT/IB2016/053102 dated Aug. 25, 2016.
KR 10-2013-0134915 Machine Translation (by EPO and Google)—published Dec. 10, 2013—Hyndai Motor Company.

* cited by examiner

PRIOR ART

CONVOY

PRIOR ART
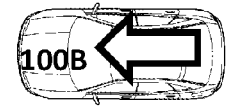
FRAME 1
Time $t = t_1$
FIG. 2A
FRAME 2
Time $t = t_2$
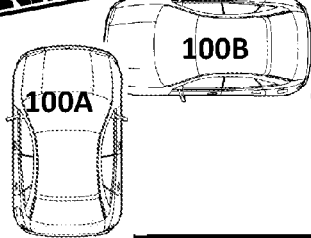
FIG. 2B Computationally predicting S301 an accident scenario by an onboard computer of the first motor vehicle, the accident scenario indicating that a first motor-vehicle accident might occur between the first and second motor vehicles

Determining S305, by the onboard computer of the first motor vehicle, if changing a velocity of the first motor vehicle in order to (i) avoid the first motor-vehicle accident and/or (ii) reduce a likelihood thereof and/or (iii) reduce a severity thereof would (i) result in a second motor-vehicle accident between the first and third motor vehicles and/or (ii) increase a likelihood of the second motor-vehicle accident

In response to a positive determining, performing S309 at least one vehicle control action by the onboard computer of the first motor vehicle for adjusting the velocity of the first motor vehicle according to respective velocities and/or accelerations of the second and third motor vehicles

FIG. 11

ALERTING PREDICTED ACCIDENTS BETWEEN DRIVERLESS CARS

CROSS-REFERENCE TO RELATED APPLICATIONS

This patent application is a continuation-in-part of both (i) PCT/IB2016/053102 filed on May 26, 2016 and (ii) U.S. patent application Ser. No. 15/165,668 filed on May 26, 2016, each of which are incorporated herein by reference in their entireties. This patent application also claims the benefit of U.S. Provisional Patent Application No. 62/166,795 filed on May 27, 2015, which is incorporated herein by reference in its entirety.

BACKGROUND

A driverless vehicle (also known as "autonomous vehicle", "self-driving vehicle" and "robotic vehicle") is a vehicle that is capable of sensing its environment and navigating without human input.

The idea of driverless cars was predicted by many science fiction and non-science fiction writers a long time ago. In recent years, this idea has been actualized, with many auto makers and research groups building such cars and conducting experiments with them.

Publications about self-driving cars include (i) "INSIDE GOOGLE'S QUEST TO POPULARIZE SELF-DRIVING CARS," By Adam Fisher, *Popular Science* (Posted Sep. 18, 2013) about Google's driverless car, and (ii) "NASA AND NISSAN JOIN FORCES TO BUILD SELF-DRIVING VEHICLES FOR EARTH AND SPACE" by Alex Davies, Wired.com (Posted Jan. 8, 2015) about Nissan's and NASA's driverless car.

The term driverless or autonomous motor-vehicles also includes semi-autonomous vehicles where a human driver may be available inside the motor-vehicle and may intervene with or take control of the driving if he so decides, as long as the motor-vehicle has a fully autonomous mode in which it navigates and drives without human input.

Obviously, a major concern with driverless cars is the avoidance of accidents where two or more cars are involved in a collision. The challenge is especially difficult under heavy traffic conditions, when many cars are driving in a convoy, continuously braking, decelerating and accelerating according to traffic events and road conditions.

First attempts for developing a driverless car relied on equipping the car with sensors capable of detecting events in all directions. For example, front-looking cameras and proximity sensors residing within a given car may monitor the car in front of it, looking for an indication it is braking or otherwise slowing down. If such an event is detected, and there is a danger of the given car hitting the car in front of it, the driving logic automatically slows down the given car or even brings it to a complete stop. Independently of that, rearward-looking cameras and proximity sensors are watching the car behind the given car, looking for an indication it is accelerating. If such an event is detected, and there is a danger of the given car being hit by the car behind it, the driving logic automatically accelerates the given car or otherwise maneuvers it to avoid being hit. Additional cameras and sensors may be directed sideways so as to watch for potential dangers from other directions.

It was soon found out that relying only on a car's own sensors is not good enough. If the car behind us is accelerating, it takes some time before the driving logic in our car knows about the event because of the time required for the sensors and the signal processing circuitry to identify it. As avoiding an accident depends on a quick response by our car, the time lost while identifying a traffic event might be crucial.

The solution adopted for solving the above problem is to have each car wirelessly transmit information about itself so that adjacent cars can receive that information and use it for taking their decisions. For example, when a driver starts to press down on his braking pedal the car immediately reports this event by transmitting a braking alert, without waiting for the braking process to actually slow down the car. The car immediately behind the braking car does not have to wait until its sensors detect an actual slowdown of the car in front of it or a lighting of its braking lights but can immediately reduce its speed based on the received alert. This way the response time available for a car to avoid an accident is longer and the risk of unavoidable accidents is reduced. In addition to reporting braking status a car may also report its location, its speed, its acceleration, failures it may have and other information that may be useful for other cars for assessing their risks and taking their decisions.

Typically driverless cars only listen to information from the car in front of them, considering it to be the main source of danger. In such case the communication is established only between adjacent cars in the traffic line (See for example "Broadband vehicle-to-vehicle communication using an extended autonomous cruise control sensor," By Heddebaut et al, Published 17 May 2005). Some driverless cars may utilize information available from any car in their vicinity, even non-adjacent ones, but this is typically limited to alerts about road conditions and traffic events occurring ahead.

FIG. 1 illustrates a convoy of motor-vehicles, where a vector of travel (i.e. direction, magnitude) is illustrated by arrows. In the example of FIG. 1 all vehicles are travelling at the same speed and in the same direction. In the example of FIG. 1, (i) vehicle 100B is behind and follows vehicle 100A and (ii) vehicle 100C is behind and follows vehicle 100B; (ii) vehicle 100D is behind and follows vehicle 100C.

FIGS. 2A-2B illustrate one example of an accident between motor-vehicles 100A, 100B—FIG. 2A corresponds to an earlier moment in time before the accident occurs and FIG. 2B illustrate the moment immediately after the collision between motor-vehicles 100A, 100B.

FIGS. 3A-3D illustrate a very specific type of accident—a chain accident. In FIG. 3A, first 100A and second 100B vehicles are stopped and waiting at a stop sign as a third vehicle 100C approaches from behind. In FIG. 3B, the third vehicle 100C hits the second vehicle 100B from behind, imparting to the second vehicle 100B forward momentum (Illustrated in FIG. 3C). In FIG. 3D, as a result of this forward momentum, second vehicle 100B hits first vehicle 100A from behind.

Intoxicated Drivers

Intoxicated drivers, otherwise known as 'drunk drivers,' are a scourge on our society. According to the National Highway Traffic Safety Administration, drunk driving involvement in fatal crashes in 2014 was almost four times higher at night than during the day (34 versus 9 percent).

US 20140297111, incorporated herein by reference in its entirety, discloses a vehicle control system comprising: an alcohol detector which detects an alcohol intake level of a driver of a vehicle; and a controller which controls the alcohol detector so that a detection of the alcohol intake level is started during a run of the vehicle just after the vehicle starts up and initially moves, wherein the controller determines whether the driver is a drunk person based on a detection result obtained from the alcohol detector, and wherein the controller stops the vehicle when the controller determines that the driver is the drunk person.

US 20140365142, incorporated herein by reference in its entirety, discloses wearable alcohol sensor that measures a user's blood alcohol level by detecting an amount of alcohol in the user's insensible perspiration.

SUMMARY

A method for attempting to avoid a potential motor-vehicle accident and/or minimizing damage caused by the potential motor-vehicle accident comprises: a. wirelessly transmitting, by non-visual electro-magnetic (EM) radiation and from a first motor-vehicle, a first accident alert comprising accident prediction data about a potential motor-vehicle accident; b. receiving the first accident alert at a second motor-vehicle; c. in response to the receiving of the first accident alert, wirelessly transmitting a second accident alert by non-visual EM radiation and from the second motor-vehicle; d. receiving the second accident alert by a third motor-vehicle; and e. in response to the receiving of the second accident alert, attempting, by an onboard computer of the third motor-vehicle, (i) to avoid being involved in the potential motor-vehicle accident and/or (ii) to reduce (e.g. minimize) damage inflicted upon the third motor-vehicle as a result of involvement in the potential motor-vehicle accident by performing at least one vehicle control action.

In some embodiments, the onboard computer of the third motor-vehicle performs the at least one vehicle control action so as to attempt to avoid being involved in the potential motor-vehicle accident.

In some embodiments, the onboard computer of the third motor-vehicle performs the at least one vehicle control action so as to attempt to reduce (e.g. minimize) damage inflicted upon the third motor-vehicle as a result of involvement in the potential motor-vehicle accident.

In some embodiments, in addition to accident prediction data, the first accident alert and/or the second accident alert includes factual input data.

In some embodiments, the factual input data includes at least one of a blood alcohol level of a human driver of the first motor vehicle and a blood alcohol level of a human driver of the second motor vehicle.

In some embodiments, the factual input data of the first and/or second accident alert includes at least one of: (i) an indication that the first motor-vehicle is braking; (ii) an indication that the first motor-vehicle is decelerating; (iii) an indication that the first motor-vehicle is accelerating; and (iv) an indication of an action by a fourth motor-vehicle.

In some embodiments, the accident prediction data of the first and/or second accident alerts includes an indication that an accident might occur between the first motor-vehicle and the second motor-vehicle.

In some embodiments, the accident prediction data of the first and/or second accident alerts includes an indication that an accident might occur between the first motor-vehicle and a fourth motor-vehicle.

In some embodiments, the second motor-vehicle follows the first motor-vehicle and the third motor-vehicle follows the second motor-vehicle.

In some embodiments, the second motor-vehicle follows the third motor-vehicle and the first motor-vehicle follows the second motor-vehicle.

In some embodiments, the attempting by the third motor-vehicle to avoid being involved in the potential motor-vehicle accident and/or to minimize damage comprises at least one of: (i) accelerating the third motor-vehicle; (ii) decelerating the third motor-vehicle; (iii) employing a steering system of the third motor-vehicle; and (iv) employing a braking system of the third motor vehicle.

In some embodiments, the accident prediction data of the received first accident alert is evaluated at the second motor-vehicle and the transmitting of the second accident alert from the second motor-vehicle is contingent upon results of the evaluation.

In some embodiments, (i) one or more onboard computer(s) of the first motor-vehicle computes accident prediction data of the first accident alert from a first set of factual input data; and (ii) one or more onboard computer(s) of the second motor-vehicle computes accident prediction data of the second accident alert from a second set of factual input data that includes factual input data not present within the first set of factual input data.

In some embodiments, the factual input data included in the second set of factual input data and not present within the first set of factual input data comprises a measurement of a blood alcohol level of a human driver of the second motor-vehicle.

In some embodiments, an alcohol sensor is present in the second motor vehicle to measure the blood alcohol level of the human driver by detecting an amount of alcohol in his/her perspiration.

In some embodiments, the accident prediction data of the second accident alert is evaluated at the second motor-vehicle and the transmitting of the second accident alert from the second motor-vehicle is contingent upon results of the evaluation.

In some embodiments, onboard computer(s) of the second motor-vehicle derive(s) accident prediction data of the second accident alert only from accident prediction data of the received first accident alert.

In some embodiments, an onboard computer of the first motor-vehicle evaluates accident prediction data and only transmits the first accident alert if a likelihood and/or severity of a predicted accident exceeds a threshold.

In some embodiments, each of the first, second and third motor-vehicle is a car.

A method for responding to a prediction of a potential accident involving first, second and third motor-vehicles, with the first, second and third motor-vehicles arranged so that (i) the second motor-vehicle is behind the first motor-vehicle and (ii) the first motor-vehicle is behind the third motor-vehicle, the method comprising: a. computationally predicting an accident scenario by an onboard computer of a first motor-vehicle, the accident scenario indicating that the first motor-vehicle might be hit from behind by a second motor-vehicle; b. in response to the predicting, wirelessly transmitting, by non-visual EM radiation and from the first motor-vehicle, an accident alert; c. receiving the accident alert by a third motor-vehicle that is in front of the first motor-vehicle; and d. in response to the receiving of the accident alert, attempting, by an onboard computer of the third motor-vehicle, (i) to avoid being hit from behind by the first motor-vehicle and/or (ii) to reduce (e.g. minimize) damage inflicted upon the third motor-vehicle resulting from being hit from behind by the first motor-vehicle, by performing at least one vehicle control action.

In some embodiments, the onboard computer of the third motor-vehicle performs the at least one vehicle control action so as to attempt to avoid being hit from behind by the first motor-vehicle.

In some embodiments, the onboard computer of the third motor-vehicle performs the at least one vehicle control action so as to attempt to reduce (e.g. minimize) damage inflicted upon the third motor-vehicle resulting from being hit from behind by the first motor-vehicle.

In some embodiments, the accident alert comprises an indication that the first motor-vehicle might be hit from behind by the second motor-vehicle.

In some embodiments, the accident alert comprises an indication that an accident may occur between the first and third motor-vehicles.

In some embodiments, the at least one vehicle control action comprises a vehicle control action that causes accelerating the third motor-vehicle.

In some embodiments, i. the onboard computer of the first and/or of the third motor-vehicle predicts at least one parameter of a chain accident resulting from said accident scenario in which the second motor-vehicle hits the first motor-vehicle and the first motor-vehicle hits the third motor-vehicle; and ii. the at least one vehicle control action is selected in accordance with at least one of the at least one parameter of the chain accident.

A method for responding to a prediction of a potential accident involving first, second and third motor-vehicles, the method comprising: a. computationally predicting an accident scenario by an onboard computer of the first motor-vehicle, the accident scenario indicating that a first motor-vehicle accident might occur between the first and second motor-vehicles; b. determining, by the onboard computer of the first motor-vehicle, if changing a velocity of the first motor-vehicle in order to (i) avoid the first motor-vehicle accident and/or (ii) reduce a likelihood thereof and/or (iii) reduce a severity thereof would (i) results in a second motor-vehicle accident between the first and third motor-vehicles and/or (ii) increases a likelihood of the second motor-vehicle accident; and c. in response to a positive determining, performing at least one vehicle control action by the onboard computer of the first motor-vehicle for adjusting the velocity of the first motor-vehicle according to respective velocities and/or accelerations of the second and third motor-vehicles.

In some embodiments, the velocity of the first motor-vehicle is adjusted so as to reduce (e.g. minimize) a predicted amount of damage inflicted upon the first motor-vehicle as a result of its involvement in the first and second motor-vehicle accidents.

In some embodiments, the velocity of the first motor-vehicle is adjusted so as to reduce (e.g. minimize) a predicted aggregate amount of damage inflicted upon a combination of at least two of the first, second and third motor-vehicles as a result of their collective involvement in the first and/or second motor-vehicle accidents.

In some embodiments, the velocity of the first motor-vehicle is adjusted without attempting to avoid the first motor-vehicle accident.

In some embodiments, the first motor-vehicle follows the second motor-vehicle and the third motor-vehicle follows the first motor-vehicle.

In some embodiments, the first motor-vehicle follows the third motor-vehicle and the second motor-vehicle follows the first motor-vehicle.

An anti-accident device for operation onboard a host motor-vehicle comprises: a. a prediction-engine for processing factual input data about a plurality of motor-vehicles and computationally predicting an accident scenario, thereby generating output prediction data of a potential accident; b. a wireless transmitter for wirelessly transmitting non-visual EM signals; c. a wireless receiver for wirelessly receiving non-visual EM signals; and d. a device controller for sending control signals to onboard vehicle controls of the host motor-vehicle where the anti-accident device resides, wherein the anti-accident onboard device provides the following features: i. in response to a predicting, by the prediction engine, of an accident scenario about a first potential motor-vehicle accident, the device controller transmits, via the wireless transmitter, a first outgoing accident alert comprising accident prediction data about the first potential motor-vehicle accident; ii. in response to a receiving, via the wireless receiver, of a first incoming accident alert comprising accident prediction data about a second potential motor-vehicle accident, the device controller transmits, via the wireless transmitter, a second outgoing accident alert comprising accident prediction data for the second potential motor-vehicle accident; iii. in response to a receiving, via the wireless receiver, of a second incoming accident alert comprising accident prediction data about a third potential motor-vehicle accident between two or more external motor-vehicles, the device controller sends control signals to one or more onboard vehicle controls of the host motor-vehicle so as (A) to avoid involvement, of the host motor-vehicle, in the third potential motor-vehicle accident; and/or (B) to reduce (e.g. minimize) damage inflicted upon the host motor-vehicle as a result of involvement in the third potential motor-vehicle accident by performing at least one vehicle control action.

An anti-accident device for operation onboard a host motor-vehicle comprises: a. a prediction-engine for processing factual input data about a plurality of motor-vehicles and computationally predicting an accident scenario; b. a wireless transmitter for wirelessly transmitting non-visual EM signals; c. a wireless receiver for wirelessly receiving non-visual EM signals; and d. a device controller for sending control signals to onboard vehicle controls of the host motor-vehicle where the anti-accident device resides, wherein the anti-accident onboard device provides the following features: i. in response to a predicting by the prediction-engine that the host motor-vehicle might be hit from behind by a first external motor-vehicle, the device controller transmits an outgoing accident alert via the wireless transmitter; ii. in response to an incoming accident alert that: A. is received via the wireless receiver; B. is received from a second external motor-vehicle that is behind of the host motor-vehicle; and C. indicates that an accident might occur behind the host motor-vehicle where the second external motor-vehicle is hit from behind by a third external motor-vehicle, the device controller sends control signals to one or more onboard vehicle controls of the host motor-vehicle to perform at least one vehicle control action in order to avoid the host motor-vehicle being hit from behind by the second external motor-vehicle and/or in order to reduce (e.g. minimize) damage inflicted upon the host motor-vehicle resulting from being hit from behind by the second external motor-vehicle.

An anti-accident device for operation onboard a host motor-vehicle comprises: a. a prediction-engine for: processing factual input data about a plurality of motor-vehicles and computationally predicting an accident scenario indicating that a first motor-vehicle accident may occur between the host motor-vehicle and a first external motor-vehicle; and determining if changing a velocity of the host motor-vehicle in order (i) to avoid the first motor-vehicle accident and/or (ii) to reduce a likelihood thereof and/or (iii) to reduce a severity thereof, would result in one or more of: (A) a second motor-vehicle accident occurring between the host motor-vehicle and a second external motor-vehicle and (ii) an increase in a likelihood that the second motor-vehicle accident will occur; and b. a device controller for responding to a positive determining by sending control signals to one or more onboard vehicle controls of the host motor-vehicle to adjust the velocity of the host motor-vehicle according to respective velocities and/or accelerations of the first and second external motor-vehicles.

A method for alerting a car about a potential car accident, comprises: a. transmitting, by a first car, a first accident alert; b. receiving the first accident alert by a second car; c. In response to the receiving of the first accident alert, transmitting a second accident alert by the second car; d. receiving the second accident alert by a third car; and e. in response to the receiving of the second accident alert, attempting to avoid a car accident by the third car.

In some embodiments, the first accident alert comprises an indication that the first car is braking.

In some embodiments, the first accident alert comprises an indication that the first car is decelerating.

In some embodiments, the first accident alert comprises an indication that the first car is accelerating.

In some embodiments, the first accident alert comprises an indication of an action by a fourth car.

In some embodiments, the first accident alert comprises an indication that a car accident might occur between the first car and the second car.

In some embodiments, the first accident alert comprises an indication that a car accident might occur between the first car and a fourth car.

In some embodiments, the second accident alert comprises an indication that the first car is braking.

In some embodiments, the second accident alert comprises an indication that the first car is decelerating.

In some embodiments, the second accident alert comprises an indication that the first car is accelerating.

In some embodiments, the second accident alert comprises an indication of an action by a fourth car.

In some embodiments, the second accident alert comprises an indication that a car accident might occur between the first car and the second car.

In some embodiments, the second accident alert comprises an indication that a car accident might occur between the first car and a fourth car.

In some embodiments, the second car follows the first car and the third car follows the second car.

In some embodiments, the second car follows the third car and the first car follows the second car.

In some embodiments, the attempting to avoid a car accident comprises braking by the third car.

In some embodiments, the attempting to avoid a car accident comprises decelerating by the third car.

In some embodiments, the attempting to avoid a car accident comprises accelerating by the third car.

A method for alerting a car about a potential car accident, comprises: a.

determining, by a first car, that a car accident might occur between the first car and a second car with the second car hitting the first car from behind; b. transmitting, by the first car, an accident alert; c. receiving the accident alert by a third car which is in front of the first car; d. in response to the receiving of the accident alert, attempting to avoid a car accident by the third car.

In some embodiments, the accident alert comprises an indication that the first car might be hit by the second car from behind.

In some embodiments, the accident alert comprises an indication that a car accident might occur between the first car and the third car.

In some embodiments, the attempting to avoid a car accident comprises accelerating by the third car.

A method for alerting a car about a potential car accident comprises: a.

determining, by a first car, that a first car accident might occur between the first car and a second car; b. determining, by the first car, that changing its speed in order to avoid the first car accident with the second car would result in the first car having a second car accident with a third car; c. in response to the determining, adjusting the speed of the first car according to the speed of the second car and according to the speed of the third car.

In some embodiments, the adjusted speed of the first car is selected so as to reduce the amount of an overall damage suffered by the first car from the first car accident and the second car accident.

In some embodiments, the first car follows the second car and the third car follows the first car.

In some embodiments, the first car follows the third car and the second car follows the first car.

A method for attempting at least one of avoiding a motor-vehicle accident and minimizing damage caused by the motor-vehicle accident, the method comprising: a. wirelessly transmitting, by non-visual electromagnetic (EM) radiation and from a first motor-vehicle, a first accident alert comprising accident prediction data (i) containing a prediction that a motor-vehicle accident will occur and (ii) including one or more predicted parameters of the motor-vehicle accident that is predicted to occur; b. receiving the first accident alert at a second motor-vehicle; c. in response to the receiving of the first accident alert, wirelessly transmitting a second accident alert by non-visual EM radiation and from the second motor-vehicle; d. receiving the second accident alert by a third motor-vehicle; and e. in response to the receiving of the second accident alert, performing by an onboard computer of the third motor-vehicle at least one vehicle control action so as to attempt at least one of the following: (i) avoiding being involved in the motor-vehicle accident that is predicted to occur; and (ii) reducing damage inflicted upon the third motor-vehicle as a result of involvement in the motor-vehicle accident that is predicted to occur.

In some embodiments, accident prediction data of the second accident alert that is received by the third motor-vehicle (i) contains the prediction that the motor-vehicle accident will occur and (ii) includes one or more of the predicted parameters of the motor-vehicle accident that is predicted to occur.

In some embodiments, at least one of the first accident alert and the second accident alert includes factual input data in addition to accident prediction data.

In some embodiments, the factual input data includes at least one of a blood alcohol level of a human driver of the first motor vehicle and a blood alcohol level of a human driver of the second motor vehicle.

In some embodiments, the factual input data includes at least one of: (i) an indication that the first motor-vehicle is braking; (ii) an indication that the first motor-vehicle is decelerating; (iii) an indication that the first motor-vehicle is accelerating; and (iv) an indication of an action by a fourth motor-vehicle.

In some embodiments, the accident prediction data includes an indication that an accident might occur between the first motor-vehicle and the second motor-vehicle.

In some embodiments, the accident prediction data includes an indication that an accident might occur between the first motor-vehicle and a fourth motor-vehicle.

In some embodiments, the second motor-vehicle follows the first motor-vehicle and the third motor-vehicle follows the second motor-vehicle.

In some embodiments, the second motor-vehicle follows the third motor-vehicle and the first motor-vehicle follows the second motor-vehicle.

In some embodiments, the at least one vehicle control action performed by the onboard computer of the third motor-vehicle includes at least one of the following: (i) accelerating the third motor-vehicle; (ii) decelerating the third motor-vehicle; (iii) employing a steering system of the third motor-vehicle; and (iv) employing a braking system of the third motor vehicle.

In some embodiments, the accident prediction data of the received first accident alert is evaluated at the second motor-vehicle and the transmitting of the second accident alert from the second motor-vehicle is contingent upon results of the evaluation.

In some embodiments, (i) one or more onboard computer(s) of the first motor-vehicle computes the accident prediction data of the first accident alert from a first set of factual input data; and (ii) one or more onboard computer(s) of the second motor-vehicle computes accident prediction data of the second accident alert from a second set of factual input data that includes factual input data not present within the first set of factual input data.

In some embodiments, the factual input data included in the second set of factual input data and not present within the first set of factual input data comprises a measurement of a blood alcohol level of a human driver of the second motor-vehicle.

In some embodiments, an alcohol sensor is present in the second motor vehicle to measure the blood alcohol level of the human driver by detecting an amount of alcohol in his/her perspiration.

In some embodiments, accident prediction data of the second accident alert is evaluated at the second motor-vehicle and the transmitting of the second accident alert from the second motor-vehicle is contingent upon results of the evaluation.

In some embodiments, onboard computer(s) of the second motor-vehicle derive(s) accident prediction data of the second accident alert only from the accident prediction data of the received first accident alert.

In some embodiments, an onboard computer of the first motor-vehicle evaluates accident prediction data and only transmits the first accident alert if at least one of a likelihood of a predicted accident and severity thereof exceeds a threshold.

A method for handling a prediction that a first motor-vehicle accident involving first and second motor-vehicles will occur, the method comprising: a. operating an onboard computer of the first motor-vehicle to predict that the first motor-vehicle accident between the first and second motor-vehicles will occur; b. determining, by the onboard computer of the first motor-vehicle, if changing a velocity of the first motor-vehicle in order to achieve at least one of the following: (i) avoid the first motor-vehicle accident, (ii) reduce a likelihood thereof, and (iii) reduce a severity thereof, would result in one or more of: A. a second motor-vehicle accident occurring between the first motor-vehicle and a third motor-vehicle; and B. an increase in a likelihood that the second motor-vehicle accident will occur; and c. in response to a positive determining, performing at least one vehicle control action by the onboard computer of the first motor-vehicle for adjusting the velocity of the first motor-vehicle according to at least one of: i. respective velocities of the second and third motor-vehicles; and ii. respective accelerations of the second and third motor vehicles.

In some embodiments, the velocity of the first motor-vehicle is adjusted so as to reduce a predicted amount of damage inflicted upon the first motor-vehicle as a result of its involvement in the first and second motor-vehicle accidents.

In some embodiments, the velocity of the first motor-vehicle is adjusted so as to reduce a predicted aggregate amount of damage inflicted upon a combination of at least two of the first, second and third motor-vehicles as a result of their collective involvement in the first and second motor-vehicle accidents.

In some embodiments, the velocity of the first motor-vehicle is adjusted without attempting to avoid the first motor-vehicle accident.

In some embodiments, the first motor-vehicle follows the second motor-vehicle and the third motor-vehicle follows the first motor-vehicle.

In some embodiments, the first motor-vehicle follows the third motor-vehicle and the second motor-vehicle follows the first motor-vehicle.

An anti-accident device for operation onboard a host motor-vehicle, the anti-accident device comprising: a. a prediction-engine for processing factual input data about a plurality of motor-vehicles and computationally predicting an accident scenario, thereby generating accident prediction data; b. a wireless transmitter for wirelessly transmitting non-visual electromagnetic (EM) signals; c. a wireless receiver for wirelessly receiving non-visual EM signals; and d. a device controller for sending control signals to onboard vehicle controls of the host motor-vehicle where the anti-accident device resides, wherein the anti-accident onboard device provides the following features: i. in response to a predicting, by the prediction engine, of an accident scenario about a first motor-vehicle accident, the device controller transmits, via the wireless transmitter, a first outgoing accident alert comprising a prediction that the first motor-vehicle accident will occur and one or more predicted parameters of the first motor-vehicle accident that is predicted to occur; ii. in response to a receiving, via the wireless receiver, of a first incoming accident alert comprising accident prediction data about a second motor-vehicle accident, the device controller transmits, via the wireless transmitter, a second outgoing accident alert comprising accident prediction data for the second motor-vehicle accident; iii. in response to a receiving, via the wireless receiver, of a second incoming accident alert comprising accident prediction data about a third motor-vehicle accident between two or more external motor-vehicles, the device controller sends control signals to one or more onboard vehicle controls of the host motor-vehicle to perform at least one vehicle control action, so as to attempt at least one of the following: (A) avoiding involvement, of the host motor-vehicle, in the third motor-vehicle accident; and (B) reducing damage inflicted upon the host motor-vehicle as a result of involvement in the third motor-vehicle accident.

In some embodiments, the anti-accident onboard device is configured so that the second outgoing accident alert (i) contains the prediction that the second motor-vehicle accident will occur and (ii) includes one or more parameters of the second motor-vehicle accident.

An anti-accident device for operation onboard a host motor-vehicle, the anti-accident device comprising: a. a prediction-engine for processing factual input data about a plurality of motor-vehicles and computationally predicting future occurrences of motor-vehicle accidents as well as one or more parameters of the motor-vehicle accidents that are predicted to occur; b. a wireless transmitter for wirelessly transmitting non-visual electromagnetic (EM) signals; c. a wireless receiver for wirelessly receiving non-visual EM signals; and d. a device controller for sending control signals to onboard vehicle controls of the host motor-vehicle where the anti-accident device resides, wherein the anti-accident onboard device provides the following features: i. in response to a computed prediction by the prediction-engine that a first motor-vehicle accident will occur, where the host motor-vehicle will be hit from behind by a first external motor-vehicle, the device controller transmits an outgoing accident alert via the wireless transmitter where the outgoing accident alert comprises: A. the prediction that the first motor-vehicle accident will occur as computed by the prediction-engine; and B. one or more computationally predicted parameters of the first motor-vehicle accident that is predicted to occur as computed by the prediction-engine; ii. in response to an incoming accident alert that: A. is received via the wireless receiver; B. is received from a second external motor-vehicle that is behind of the host motor-vehicle; and C. indicates that a second motor-vehicle accident will occur behind the host motor-vehicle where the second external motor-vehicle is hit from behind by a third external motor-vehicle; D. includes one or more parameters of the second motor-vehicle accident, the device controller sends control signals to one or more onboard vehicle controls of the host motor-vehicle to perform at least one vehicle control action so as to attempt at least one of the following: A. avoiding the host motor-vehicle being hit from behind by the second external motor-vehicle; and B. reducing damage inflicted upon the host motor-vehicle resulting from being hit from behind by the second external motor-vehicle.

In some embodiments, the outgoing accident alert transmitted via the wireless transmitter of the host motor-vehicle comprises an indication that the host motor-vehicle will be hit from behind by the first external motor-vehicle.

In some embodiments, the outgoing accident alert transmitted via the wireless transmitter of the host motor-vehicle comprises an indication that an accident may occur between the host motor-vehicle and a fourth external motor-vehicle.

In some embodiments, the at least one vehicle control action includes a vehicle control action that causes accelerating of the host motor-vehicle.

In some embodiments, the vehicle control action that causes accelerating of the host motor-vehicle attempts to avoid being hit from behind by the second external motor-vehicle.

In some embodiments, the vehicle control action that causes accelerating of the host motor-vehicle attempts to reduce damage inflicted upon the host motor-vehicle resulting from being hit from behind by the second external motor-vehicle.

An anti-accident device for operation onboard a host motor-vehicle, the anti-accident device comprising: a. a prediction-engine for: processing factual input data about a plurality of motor-vehicles and computationally predicting that a first motor-vehicle accident between the host motor-vehicle and a first external motor-vehicle will occur; and determining if changing a velocity of the host motor-vehicle in order to achieve at least one of the following: (i) to avoid the first motor-vehicle accident, (ii) to reduce a likelihood thereof, (iii) to reduce a severity thereof, would result in one or more of: (A) a second motor-vehicle accident occurring between the host motor-vehicle and a second external motor-vehicle and (B) an increase in a likelihood that the second motor-vehicle accident will occur; and b. a device controller for responding to a positive determining by sending control signals to one or more onboard vehicle controls of the host motor-vehicle to adjust the velocity of the host motor-vehicle according to at least one of respective velocities of the first and second external motor-vehicles and respective accelerations of the first and second external motor-vehicles.

An anti-accident system comprising: a plurality of anti-accident devices, each given anti-accident device of the plurality respectively comprising: a. a respective prediction-engine for processing factual input data about a plurality of motor-vehicles and computationally predicting future occurrences of motor-vehicle accidents as well as one or more parameters of the motor-vehicle accidents that are predicted to occur; b. a respective wireless transmitter for wirelessly transmitting non-visual electromagnetic (EM) signals; c. a respective wireless receiver for wirelessly receiving non-visual EM signals; and d. a respective device controller for sending control signals to onboard vehicle controls of a respective host motor-vehicle where the given anti-accident device resides, wherein the plurality of anti-accident devices comprises first, second and third anti-accident devices such that, when the first, second and third anti-accident devices respectively reside in first, second and third motor-vehicles, the anti-accident devices perform the following operations: i. the prediction engine of the first anti-accident device predicts that a specific motor vehicle accident will occur and computes one or more computationally predicted parameters of the specific motor vehicle accident predicted to occur; ii. the wireless transmitter of the first anti-accident device wirelessly transmits, by non-visual electromagnetic (EM) radiation and from the first motor-vehicle, a first accident alert comprising the prediction that the specific motor vehicle accident will occur along with one or more of the computationally predicted parameters of the specific motor-vehicle accident that is predicted to occur; ii. the second anti-accident device wirelessly receives the first accident alert, and responds by wirelessly transmitting a second accident alert by non-visual EM radiation; iii. the third anti-accident device wirelessly receives the second accident alert and responds by performing at least one vehicle control action so as to attempt at least one of the following: (A) avoiding getting the third motor-vehicle involved in the specific motor-vehicle accident that is predicted to occur and (B) reducing damage inflicted upon the third motor-vehicle as a result of involvement in the specific motor-vehicle accident that is predicted to occur.

In some embodiments, the second accident alert wirelessly transmitted by the second anti-accident device comprises the prediction that the specific motor vehicle accident will occur along with one or more of the computationally predicted parameters of the specific motor-vehicle accident that is predicted to occur.

An anti-accident system comprising: a plurality of anti-accident devices, each given anti-accident device of the plurality respectively comprising: a. a respective prediction-engine for processing factual input data about a plurality of motor-vehicles and computationally predicting future occurrences of motor-vehicle accidents as well as one or more parameters of the motor-vehicle accidents that are predicted to occur; b. a respective wireless transmitter for wirelessly transmitting non-visual electromagnetic (EM) signals; c. a respective wireless receiver for wirelessly receiving non-visual EM signals; and d. a respective device controller for sending control signals to onboard vehicle controls of a respective host motor-vehicle where the given anti-accident device resides, wherein the plurality of anti-accident devices comprises first and second anti-accident devices such that, when: i. first, second and third motor-vehicles are arranged relative to each other so that the second motor-vehicle is behind the first motor-vehicle and the first motor-vehicle is behind the third motor-vehicle; and ii. the first anti-accident device resides in the first motor-vehicle and the second anti-accident device resides in the third motor-vehicle, the first and second anti-accident devices perform the following operations: A. in response to a prediction-engine of the first anti-accident device computationally predicting that a specific motor-vehicle accident will occur where the first motor-vehicle will be hit from behind by the second motor-vehicle along with one or more parameters of the specific motor-vehicle accident that is predicted to occur, a wireless transmitter of the first anti-accident device wirelessly transmits, by non-visual EM radiation and from the first motor-vehicle, an accident alert comprising the prediction that the specific motor-vehicle accident will occur and the predicted one or more parameters of the specific motor-vehicle accident; and B. in response to a wireless receiving of the accident alert by the second anti-accident device on the third motor-vehicle which is in front of the first motor-vehicle, the second anti-accident device performs at least one vehicle control action at the third motor-vehicle so as to attempt at least one of the following (i) avoiding being hit from behind by the first motor-vehicle and (ii) reducing damage inflicted upon the third motor-vehicle resulting from being hit from behind by the first motor-vehicle.

In some embodiments, the accident alert transmitted by the wireless transmitter of the first motor-vehicle comprises an indication that the first motor-vehicle will be hit from behind by the second motor-vehicle.

In some embodiments, the accident alert transmitted by the wireless transmitter of the first motor-vehicle comprises an indication that an accident may occur between the first and third motor-vehicles.

In some embodiments, the at least one vehicle control action includes a vehicle control action that causes accelerating of the third motor-vehicle.

In some embodiments, the vehicle control action that causes accelerating of the third motor-vehicle attempts to avoid being hit from behind by the first motor-vehicle.

In some embodiments, the vehicle control action that causes accelerating of the third motor-vehicle attempts to reduce damage inflicted upon the third motor-vehicle resulting from being hit from behind by the first motor-vehicle.

BRIEF DESCRIPTION OF THE DRAWINGS

FIGS. 1, 2A-2B and 3A-3D present some prior-art accident scenarios.

FIGS. 4, 7A-7B, 9 and 11 are flow-charts of methods that are performed by driverless vehicles that may reduce a likelihood and/or severity of motor-vehicle accident(s).

DETAILED DESCRIPTION OF EMBODIMENTS

Figure 1:
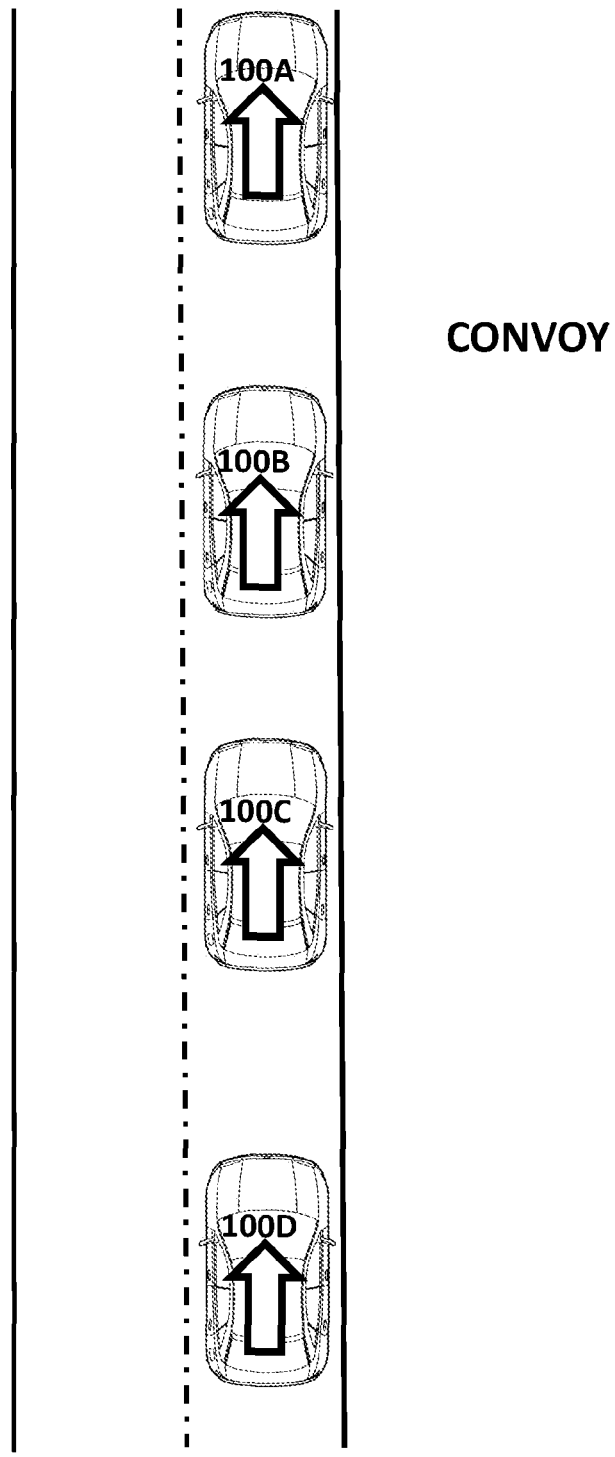
Figure 3A:
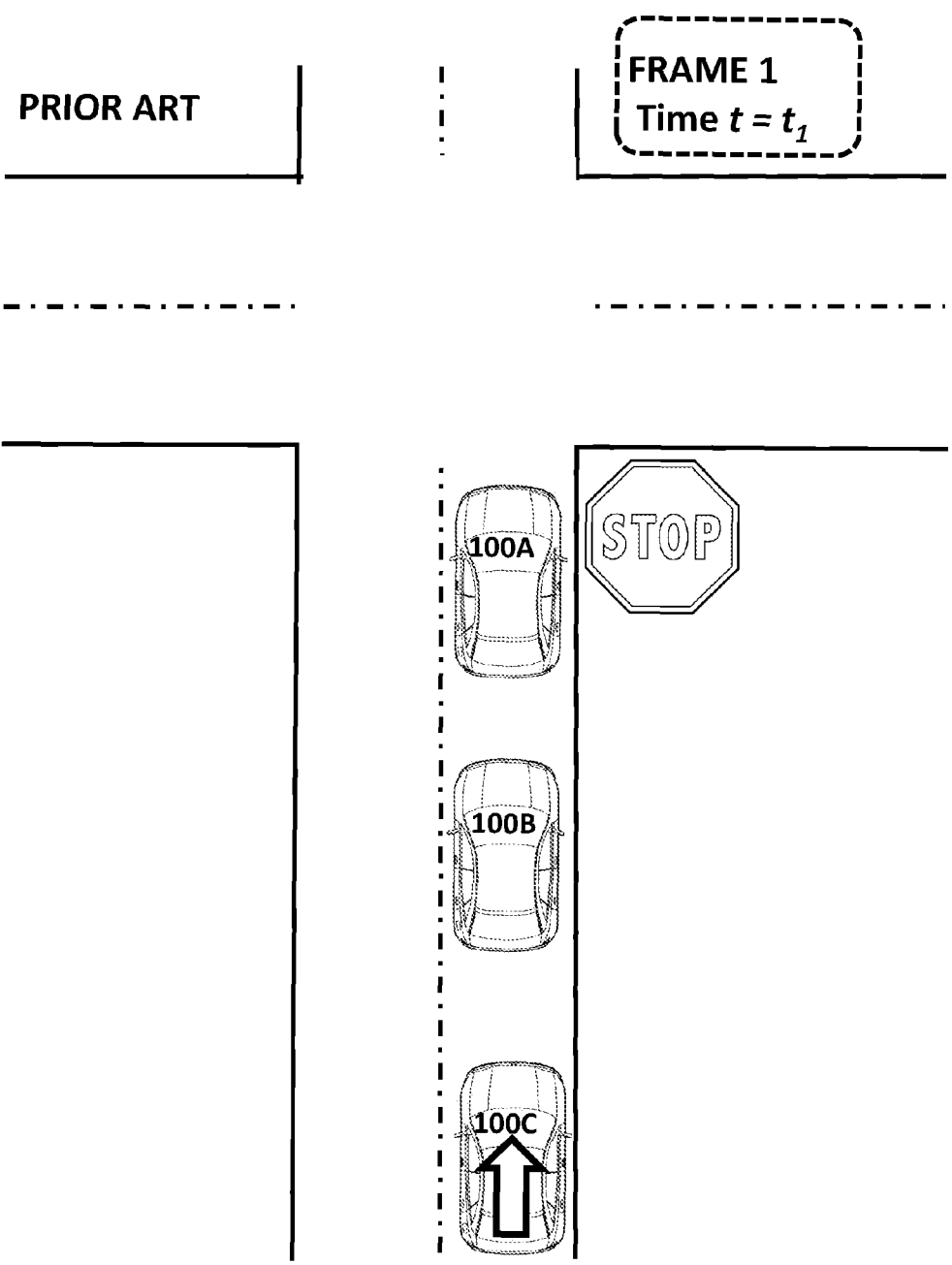
Figure 3B:
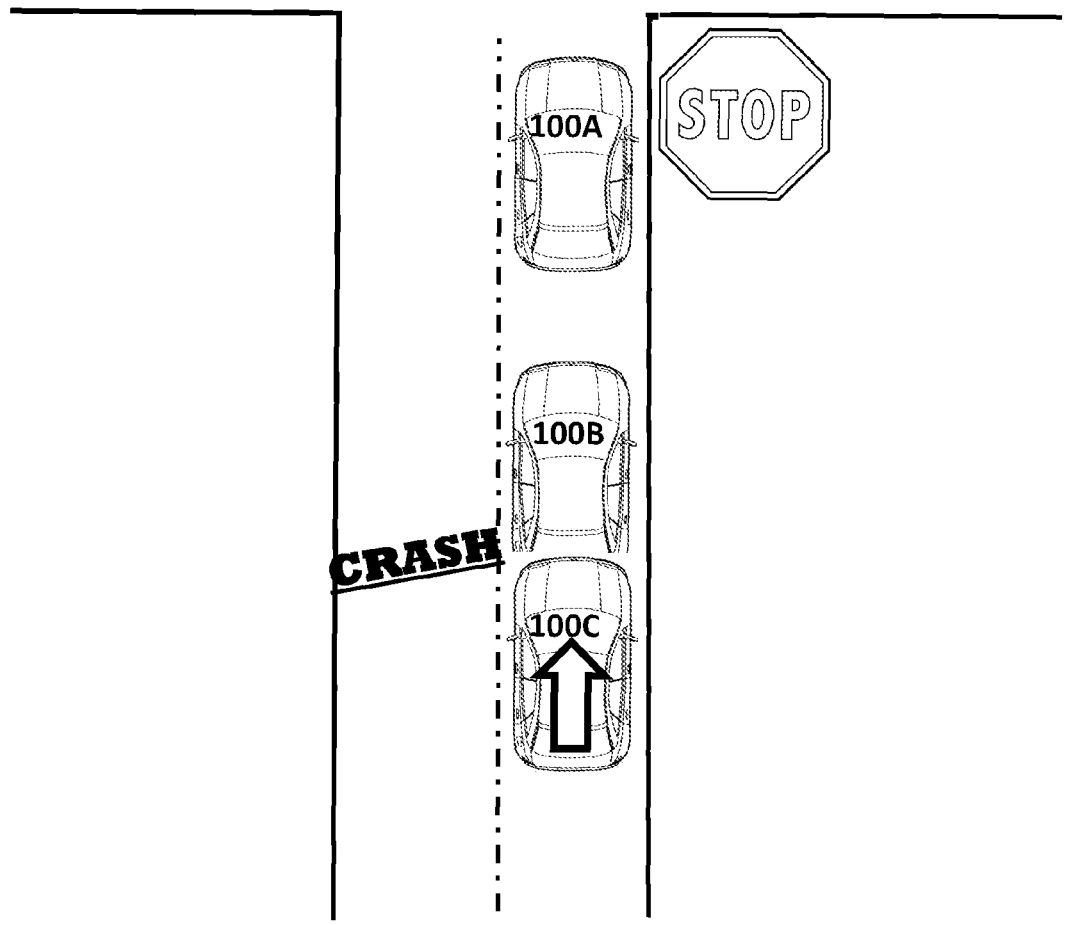
Figure 3C:
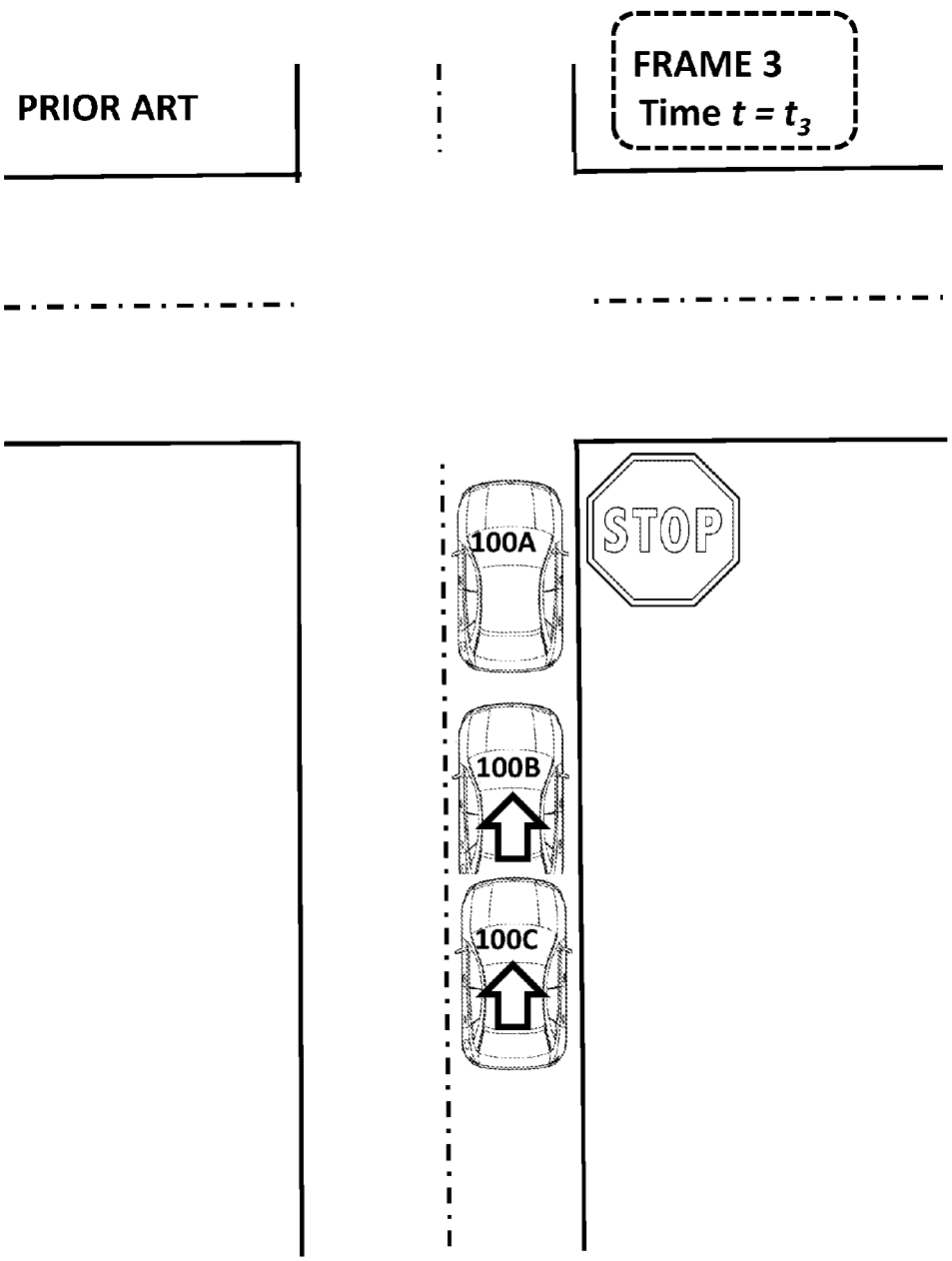
Figure 3D:
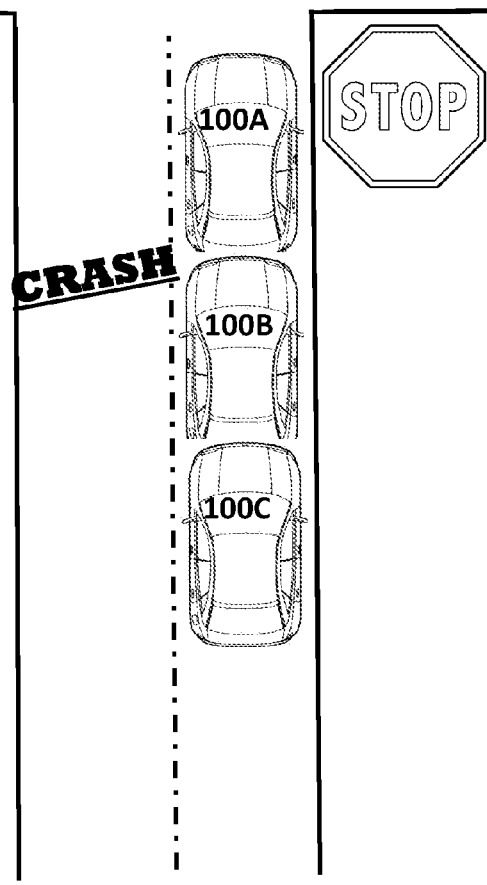

The claims below will be better understood by referring to the present detailed description of example embodiments with reference to the figures. The description, embodiments and figures are not to be taken as limiting the scope of the claims. It should be understood that not every feature of the presently disclosed methods, apparatuses, and computer readable media having stored thereon computer code for attempting to avoid potential motor-vehicle accident(s) is necessary in every implementation. It should also be understood that throughout this disclosure, where a process or method is shown or described, the steps of the method may be performed in any order or simultaneously, unless it is clear from the context that one step depends on another being performed first. As used throughout this application, the word "may" is used in a permissive sense (i.e., meaning "having the potential to"), rather than the mandatory sense (i.e. meaning "must").

Definitions

Within this application the following terms should be understood to have the following meaning:

a. motor-vehicle—a wheeled or tracked motorized vehicle that travels on land including car, motorcycle, truck, bus, and van. Typically, but not necessarily, a motor-vehicle has different compartments including (i) a cabin for passengers (ii) an engine compartment where the engine is located (e.g. under the hood in front of the cabin) and (iii) a baggage compartment or trunk. An engine of a car may be of any type, including an internal combustion motor and an electrical motor.

b. onboard device of a motor-vehicle—a device mounted to and/or disposed on and/or disposed within and/or attached to a motor-vehicle. This motor-vehicle is referred to as the 'host' motor-vehicle of the onboard device.

An onboard device of a host motor-vehicle necessarily travels with the motor-vehicle as it moves—e.g. at the same velocity or substantially the same velocity. An onboard device is not required to be permanently associated with a motor-vehicle—in some embodiments, an onboard device may be temporarily associated with a motor-vehicle (e.g. a passenger manually brings a smartphone into the cabin of the car—for example, in his/her pocket). In other embodiments, an onboard device may be permanently associated with a motor-vehicle—i.e. a passenger cannot simply remove the device from the motor-vehicle without using a special tool. In different embodiments, an onboard device may be disposed within the cabin, the engine compartment (e.g. attached to the engine or to a component thereof), under the chassis, on the roof, or in the baggage compartment of the motor-vehicle. Onboard devices may be mechanical, electronic or combinations thereof.

Examples of an onboard device of a motor-vehicle include (i) onboard electronic circuitry (e.g. any combination of hardware and/or software—e.g. digital computer or code/software executing on a digital computer), (ii) an onboard vehicle control (defined below), (iii) an onboard sensor (e.g. radar device, camera, etc.), (iv) an onboard transmitter or receiver of EM radiation (e.g. transmitter or receiver of non-visible EM radiation); and (v) an onboard passenger-safety device such as a seatbelt or an airbag.

For the present disclosure, an onboard device is said to reside (i.e. temporally or permanently) on (or to reside in) a host motor-vehicle. For the onboard device, all motor-vehicles other than the host motor-vehicle are referred to as 'external' motor-vehicles.

c. velocity—Refers to a vector, having both magnitude and orientation. In other words, the velocity of a motor-vehicle includes both its speed (for example measured in meters per second) and its direction in space (for example expressed by a horizontal direction measured in degrees from north or from the centerline of the road, or expressed by both a horizontal direction and a vertical direction measured in degrees from the horizontal plane).

d. onboard vehicle control—a specific type of an onboard device of a motor-vehicle—an onboard vehicle control may have any feature(s) of onboard devices of a motor-vehicle. Operations of an onboard vehicle control affect the motion of the vehicle. An onboard vehicle control may be situated in the cabin such as an accelerator pedal ('gas'), a decelerator pedal ('brake'), and a steering device (e.g. steering wheel). Alternatively, an onboard vehicle control may be outside of the cabin—for example, within the engine (e.g. a valve within the engine which regulates a flow of fuel), mounted to and under the vehicle, or in any other location. A device that is outside of the vehicle and not onboard, but which nevertheless sends signals that control the vehicle (e.g. a wireless transmitter which wirelessly sends signals to onboard vehicle control(s)) is not considered an onboard vehicle control, even if the wireless signals (i.e. once received at the vehicle and processed by onboard vehicle control(s)) affect the motion of the vehicle.

In different embodiments, the onboard vehicle control is mechanically coupled to an element of the engine or of the transmission system or of the braking system or of the steering system, and/or an electrical component of the onboard vehicle control is in wired or wireless communication with an element mechanically coupled to an element of the engine or of the transmission system or of the braking system or of the steering system.

e. vehicle-control action—an action (e.g. triggered by an autonomous driving module) that changes a physical state of an onboard vehicle control to modify the motion of the motor-vehicle—e.g. depressing on the brake pedal, releasing the break pedal, turning the steering wheel, increasing a flow of fuel to the engine, engaging brake discs to retard motion of a wheel shaft. In some examples, a vehicle-control action changes a state of cabin-disposed vehicle control(s)—e.g. depressing the brake pedal or turning the steering wheel. However, this is not a requirement, and in other examples a vehicle-control action only changes the state of onboard vehicle control(s) disposed outside of the cabin (e.g. changing the state of a valve disposed within the engine compartment).

f. performing an action by a motor-vehicle—when a motor-vehicle or an onboard device thereof (e.g. an onboard vehicle control or an onboard transmitter or an onboard receiver or onboard electric circuitry) automatically (i.e. without human intervention) performs one or more of the following: (i) performing a vehicle-control action (e.g. rotating the steering wheel)—for example, for a specific purpose such as avoiding an accident (e.g. either involving the given motor-vehicle or involving two or more motor-vehicles other than the given motor-vehicle); (ii) transmitting or receiving a message (e.g. by transmitting or receiving non-visible EM radiation)—this may include electronically encoding or decoding the message g. prediction engine—an electronic module (i.e. implemented in any combination of hardware, firmware, software) which processes factual input data and computationally predicts an outcome. The prediction engine may be deterministic, non-deterministic or a combination of modules of both types. In some embodiments, the prediction engine employs machine learning algorithms including but not limited to regression models (e.g. linear or non-linear), Markov models, neural networks, and the like. A deterministic prediction engine and a deterministic module always produce the same results for the same set of inputs. A non-deterministic prediction engine and a non-deterministic module employ random or pseudo-random techniques (e.g. employ a random or pseudo-random number generator) and thus do not always produce the same results for the same set of inputs.

h. factual input data—facts that are input into a prediction engine and may be used by it for making its predictions. Examples of factual input data are:
  (i) object-intrinsic data:
    (A) motor-vehicle intrinsic data related to one or more motor-vehicles: the weight of a motor-vehicle, the acceleration capability, the braking capability, etc.;
    (B) road intrinsic data—road curvature, road width, road slope, road surface-status (e.g. asphalt vs. gravel)
    (C) driver intrinsic data—age of the driver, number of years of experience, driving record (i.e. is this a driver with many previous accidents or traffic-violations?)
  (ii) current-status data:
    (A) Motor-vehicle data—absolute or relative location data describing a position and/or orientation of vehicle(s); first and/or second time derivatives of location data (e.g. speed or acceleration, linear and/or angular); current or past status of vehicle controls (e.g. brake-pedal currently depressed, angle of the steering wheel);
    (B) Terrain/road data—road conditions such as wet/dry/icy pavement, ambient wind speed, ambient light/darkness, current precipitation or lack thereof;
    (C) Driver data—is the driver of vehicle X a human driver or an automated computer-driving-module? If the driver is a human driver, is this driver nervous or sleepy or intoxicated?

At least some factual input data can also be classified based upon the instrument (i.e. type of instrument or location of instrument) which acquires the factual input data. Some examples of instrument-related categories of factual input data are:
  (A) Radar-generated data
  (B) Infrared data
  (C) Camera-Acquired Data;
  (D) Data acquired by an instrument mounted to a motor-vehicle;
  (E) data acquired by an instrument not mounted to any motor-vehicle—e.g. a stationary instrument (for example, mounted to a street-sign)

i. computationally predicting an outcome—predicting, by a prediction engine, at least one of (i) a future outcome (for example, "car X will hit car Y"); (ii) a likelihood of a future outcome, either absolute likelihood or relative likelihood relative to another candidate future outcome (for example "there is 80% probability that car X will hit car Y" or "the probability that car X will hit car Y is twice the probability that car X will hit car Z"). The prediction is based at least on factual input data describing current and/or past facts. The result of predicting an outcome is 'outcome prediction data.' Factual input data is by definition not 'outcome prediction data' since 'factual input data' only refers to current or past facts and do not involve any future prediction. In some embodiments, 'predicting an outcome' includes predicting one or more future vehicle control actions—e.g. predicting that the driver of car X will notice that s/he is about to hit a tree so s/he will swerve to the left. Predicting an outcome may be related to a specific time-interval—i.e. the predicted outcome may be a list of one or more event(s) that are predicted to occur during a specific time interval.

j. updating an outcome prediction—a special case of computationally predicting an outcome for a future time (or a future time-interval) where there was a previous computation of an outcome prediction related to the same future time (or future time-interval) and at least a part of the factual input data available to the current computation was not available for the computation of the previous outcome prediction. It should be noted that the current computation of the outcome prediction may or may not rely on the previous outcome prediction. In other words—the current computation may calculate the new outcome prediction relying only on the current factual input data, or it may save computation effort by using the previous outcome prediction.

One example of updating an outcome prediction is as follows: Car B follows Car A and Car A suddenly starts braking. At time t1, it is predicted in PREDICTION_A that the likelihood of an accident (car B hitting a rear of car A) occurring during the time interval [t4,t5] between Car 'A' and Car 'B' is 80%. At time t2, Car A reduces its braking force and Car B starts braking. At time t3, based upon the updated data and PREDICTION_A, it is predicted in PREDICTION_B that the likelihood of an accident occurring during the time interval [t4,t5] between Car 'A' and Car 'B' is now 40%. It is noted that PREDICTION_B is based upon additional factual input data not available to PREDICTION_A.

k. computationally predicting an accident scenario—a special case of computationally predicting an outcome where information about a 'hypothetical accident' (i.e. an accident which did not occur yet at the time of the predicting and which may or may not occur) is predicted. Predicting an accident scenario may refer to at least one of: (i) predicting a likelihood of an hypothetical accident (including as special cases predicting that the accident is highly likely to occur and predicting that the accident is highly unlikely to occur); (ii) predicting one or more parameters of the hypothetical accident, which may be for example (A) which motor-vehicles will collide in the accident; (B) a 'collision location' (e.g. front left fender, rear bumper, right door) of one or more motor-vehicles involved in the accident; (C) a severity of the accident. The result of predicting an accident scenario is the 'accident prediction data.'

In some embodiments, 'computationally predicting an accident scenario' includes predicting one or more future vehicle control actions and the 'accident prediction data' is generated in accordance with the predicting of the one or more future vehicle control actions. In other words, the predicting of an accident scenario may predict that the present factual input data (for example the cars' speed) will remain unchanged or that one or more vehicle control actions will soon take place and affect the accident prediction data.

l. accident prediction data—a special case of outcome prediction data that is generated by computationally predicting an accident scenario.

m. potential accident or hypothetical accident—For the present disclosure, the terms "hypothetical accident" and "potential accident" are used interchangeably and both refer to an accident which has not yet occurred at the time of the predicting and which may or may not occur.

n. accident alert—a message sent from a motor-vehicle that includes at least 'accident prediction data'. Optionally, in addition to the 'accident prediction data,' the accident alert also includes additional data such as 'factual input data' used by the sending motor-vehicle for generating the accident prediction data. One type of accident alert is an 'elevated-risk accident alert' where the 'accident prediction data' included in the message indicates that the likelihood or severity of a hypothetical accident (i) exceeds a likelihood threshold or a severity threshold or (ii) has increased relative to a previous prediction, with or without expressly including a level of likelihood and/or a level of severity. It should be understood that the accident alert is not the accident prediction data contained in the message but the event of sending the message. In other words—if the same accident prediction data is sent in two different messages then there are two different accident alerts being sent.

o. evaluating accident prediction data—analyzing accident prediction data to determine at least one of (i) if a likelihood of an accident occurring (i.e. as described by the accident prediction data) exceeds a threshold likelihood value; (ii) if a severity of a predicted accident (i.e. as described by the accident prediction data) exceeds a threshold severity value.

p. transmitting—wirelessly transmitting, typically by non-visual EM radiation such as radio frequency (RF) radiation or infrared (IR) radiation. Transmitting typically entails encoding data by a digital computer or encoder.

q. motor-vehicle accident—a collision between multiple motor-vehicles or a collision between a motor-vehicle and one or more objects that are not motor-vehicles. When a given motor-vehicle is involved in a motor-vehicle accident, at least one other motor-vehicle hits the given motor-vehicle or the given motor-vehicle hits at least one other motor-vehicle and/or at least one non-motor-vehicle object.

r. attempting to avoid being involved in a potential motor-vehicle accident—performing a vehicle-control action by a given motor-vehicle (i.e. by sending electrical signals to onboard vehicle control(s) of the given motor-vehicle by an onboard computer of the given motor-vehicle) in response to an accident alert. The accident alert includes accident prediction data indicating that (i) a potential motor-vehicle accident may occur (i.e. with non-zero probability); and (ii) there is a non-zero probability that the given motor-vehicle will be involved in that motor-vehicle accident.

In attempting to avoid being involved in this potential motor-vehicle accident, the given motor-vehicle performs a vehicle-control action that attempts to (i) prevent the potential motor-vehicle accident from occurring altogether (or at least, to reduce the probability that the potential motor-vehicle accident will occur); or (ii) without necessarily reducing the probability that the potential motor-vehicle accident will occur, reduce the likelihood that the given motor-vehicle will be involved in the potential motor-vehicle accident (if it occurs).

Consider a predicted motor-vehicle accident where cars A, B, and C are travelling as a convoy—i.e. car A is close behind car B, and car B is close behind car C. In this predicted motor-vehicle accident example, (i) car "A" is predicted to hit car "B" and to transfer momentum to car "B"; and (ii) this transferred momentum is predicted to cause car "B" to hit car "C." Car C may attempt to avoid being involved in the motor-vehicle accident by accelerating—this might not necessarily reduce the probability that some sort of accident will occur (i.e. car A hitting car B without any other car getting hit)—however, this will reduce the likelihood that car C will be hit by car B, and thus will reduce the likelihood that car C will be involved in this potential motor-vehicle accident.

Examples of attempts to avoid being involved in a potential motor-vehicle accidents may include employing the steering system to change a direction of travel in order to attempt to avoid hitting an object in front of the motor-vehicle, employing the braking system to slow the motor-vehicle in order to attempt to avoid hitting another motor-vehicle, increasing the power-output of the engine to increase the speed of a motor-vehicle in order to attempt to avoid being hit by another motor-vehicle (e.g. by engaging a throttle).

s. speed of a motor-vehicle—defined according to the direction the motor-vehicle is facing. A motor-vehicle moving forward has a positive speed, and a motor-vehicle moving backwards (e.g. driving in reverse gear) has a negative speed.

t. accelerating a motor-vehicle—applying a positive acceleration to the motor-vehicle so that its speed increases.

u. decelerating a motor-vehicle—applying a negative acceleration to the motor-vehicle so that its speed decreases.

v. chain accident—an accident involving 3 or more motor-vehicles, in which a first car hits a second car from behind, and as a result of the collision between the first and second cars, the second car subsequently hits a third car from behind.

w. parameter of an accident—a property of an actual or potential accident. Parameters could include a collision speed, an elapsed time between a first and a second collision of a chain accident, a collision angle, and a location on the road where the accident would occur. A parameter of a potential chain accident is a parameter that is predicted (e.g. by a prediction engine). A probability of whether or not a potential chain accident will occur is, by definition, not a parameter of the potential chain accident.

x. predicting that an accident might occur—predicting a non-zero probability that a potential accident will occur.

y. positive determining—in some embodiments, a determining is made if a condition is true. One example of a condition is if performing an action would achieve a given result. An example of an action is changing a velocity of a motor-vehicle. An example of a result is that a motor-vehicle accident will occur or that a likelihood that a motor-vehicle accident will occur will be increased.

If, in fact, it is determined that the condition is true, this is a positive determining. For example, if it is determined that performing the action would achieve the given result, this is an example of a positive determining.

z. visible light and non-visible electromagnetic (EM) radiation—the visible spectrum is the portion of the electromagnetic spectrum that is visible to the human eye. Electromagnetic radiation in this range of wavelengths is called visible light or simply light. A typical human eye will respond to wavelengths from about 390 to 700 nm. Non-visible EM radiation is any EM radiation other than visible light. In one example of non-visible EM radiation, a wavelength of the EM radiation is greater than wavelengths of radiation in the visible spectrum—e.g. a wavelength of the EM radiation exceeds 800 nm or exceeds 900 nm or exceeds 1000 nm. One example of EM radiation is infrared (IR) radiation. Another example is radiofrequency (RF) radiation. Another example is microwave radiation. It is noted that methods of transferring messages between motor-vehicles using non-visible EM radiation are well known in the art.

Preliminary Discussion—Examples where it is Useful to Control a Motor-vehicle According to Predictions of Potential Accidents Involving Non-Adjacent Vehicles Embodiments of the invention relate to computer-controlled driverless motor-vehicles that respond to computed predictions of potential accidents involving motor-vehicles that at least one of them is not directly adjacent to the computer-controlled motor-vehicle. In some embodiments, accident alerts comprising accident prediction data are transmitted between motor-vehicles.

Without limitation, a number of examples where presently-disclosed teachings may be applied to reduce risk of involvement in accident(s) and/or to minimize severity of accident(s) are now presented. In all four examples, a convoy of four vehicles drive in the same direction as illustrated in FIG. 1.

First example—the problem: In the first example, it is desired to minimize a likelihood that vehicle 100B will be involved in an accident. Vehicle 100B monitors its distance from both adjacent vehicles in the same lane—from vehicle 100A and vehicle 100C, as these are the two vehicles that are adjacent to vehicle 100B and there is a risk of collision between either of these vehicles and vehicle 100B. However, in reality vehicle 100D is also important for vehicle 100B—if vehicle 100D accelerates and strongly hits vehicle 100C from behind, then vehicle 100C will "jump forward" because of the hit and might itself hit vehicle 100B. When vehicle 100C is hit from behind from vehicle 100D, this may cause vehicle 100C to travel forward at a speed faster than predicted by an onboard computer of vehicle 100B. As a consequence, vehicle 100B might not have enough time to react before vehicle 100C (i.e. which is travelling forward at speed that is faster than expected) hits vehicle 100B from behind.

Second example—the problem—In the second example, it is desired to minimize a likelihood that vehicle 100C will be involved in an accident. Vehicle 100C monitors its distance from vehicle 100B and vehicle 100D, as these are the two vehicles that are adjacent to vehicle 100C and there is a risk of collision between either of these vehicles and vehicle 100C. However, in reality vehicle 100A is also important for vehicle 100C—if vehicle 100A suddenly brakes and is hit by vehicle 100B, then vehicle 100B might encounter an immediate stop because of the hit and might itself be hit by vehicle 100C. Because of hitting vehicle 100A, vehicle 100B's stopping might be much faster than what vehicle 100C is expecting from a normally braking vehicle and vehicle 100C might not have enough time to react before hitting vehicle 100B.

Other scenarios are also possible in which events related to even more distant cars have effect on our car. For example, if in the above first example vehicle 100D is about to be hit from behind by another car ('vehicle E'—NOT SHOWN—which is directly behind vehicle 100D) then a "chain accident" might occur that will eventually include vehicle E, vehicle 100D, vehicle 100C and vehicle 100B.

Comment on Transmitting Data—It is noted that attempting to rely on receiving the accident alerts by non-adjacent cars (thus solving at least some of the problematic accident scenarios) may be problematic as this approach either requires powerful and expensive transmitters because of the increased range we need to cover, or it might result in a non-reliable system if the transmission power is not high enough for good communication between non-adjacent cars.

According to some embodiments of the present invention, one vehicle alerts another vehicle about a potential accident, even though that potential accident involves a clash between the alerting car and a third vehicle.

First example—solution: In the case of the first example above (when vehicle 100D is about to hit vehicle 100C), at some point in time vehicle 100C will detect it is about to be hit by vehicle 100D or that there is a high probability (e.g.

higher than some threshold probability) that it will be hit by vehicle 100D. Vehicle 100C will immediately transmit out that prediction as part of an accident alert, and this accident alert will be received by vehicle 100B. Note that at the time of receiving this accident alert at vehicle 100B, there might not yet be any indication from vehicle 100B's own sensors that anything unusual is about to happen. Thus, the proposed solution increases the time available to vehicle 100B to respond.

Vehicle 100B may respond to the accident alert by whatever response found to be optimal under the circumstances. For example, vehicle 100B may immediately accelerate forward in order to minimize the danger of being hit by vehicle 100C either as part of a chain accident or because vehicle 100C is accelerating to avoid being hit by vehicle 100D. Additionally, vehicle 100B may also pass an alert to vehicle 100A causing it to also accelerate so that vehicle 100B will not hit it from behind while trying to avoid being hit by vehicle 100C. Alternatively, vehicle 100B may reach a conclusion (i.e. an onboard computer of vehicle 100B may conclude) that the accident is unavoidable and then activate and hold its brakes as firmly as possible, so that when being hit it will not move too much, thus lowering the risk to its passengers.

Other decision rules for selecting the optimal response to an accident alert are also possible, and in following such rules vehicle 100B may use any information it has available. For example, the decision rule may depend on the current speed of vehicle 100B, on the current speed of vehicle 100C, on the current speed of vehicle 100D, on the current speed of vehicle 100A, on the distance between vehicle 100B and vehicle 100C, on the distance between vehicle 100C and vehicle 100D, on the distance between vehicle 100A and vehicle 100B, or on any combination of such factors. In order to enable a car to select an optimal response, alert messages may include not only an accident alert but also information about speed of cars adjacent to the message sender and distances between the message sender and the cars adjacent to it. Such information may be copied into secondary alerts triggered by an initial accident alert, thus spreading speed and distance information along the convoy to distant cars.

Second example—solution: In the case of the second example above (when vehicle 100B is about to hit vehicle 100A), at some point in time vehicle 100B will detect it is about to hit vehicle 100A or that there is a high probability (e.g. higher than some threshold probability) that it will hit vehicle 100A. In this example, vehicle 100B will immediately transmit out that prediction, which will be received by vehicle 100C. Note that at the time of receiving this accident alert at vehicle 100C there might not yet be any indication from vehicle 100C's own sensors that anything unusual is about to happen. Thus, the proposed solution increases the time available to vehicle 100C to respond.

Vehicle 100C may respond to the accident alert by whatever response found to be optimal under the circumstances. For example, vehicle 100C may immediately brake in order to minimize the danger of hitting vehicle 100B. Additionally, vehicle 100C may also pass an alert to vehicle 100D causing it to immediately brake so that vehicle 100D will not hit vehicle 100C from behind while vehicle 100C is trying to avoid hitting vehicle 100B. Alternatively, vehicle 100C may reach a conclusion (i.e. an onboard computer of vehicle 100C may conclude) that the accident is unavoidable and then adjust its speed to some optimal value that is considered to be optimal in the sense that it minimizes the overall damage to vehicle 100C passengers when vehicle 100C is being caught in the middle between vehicle 100B and vehicle 100D in a chain accident.

Here too, other decision rules for selecting the optimal response to an accident alert are also possible, and in following such rules vehicle 100C may use any information it has available. For example, the decision rule may depend on the current speed of vehicle 100C, on the current speed of vehicle 100B, on the current speed of vehicle 100A, on the current speed of vehicle 100D, on the distance between vehicle 100B and vehicle 100C, on the distance between vehicle 100A and vehicle 100B, on the distance between vehicle 100C and vehicle 100D, or on any combination of such factors.

While the above discussion emphasized the use of accident alerts received in a given car in responding to accidents about to occur between two other cars, the benefits of the proposed idea are not limited to such case. For example, if vehicle 100C determines (i.e. an onboard computer of vehicle 100C determines) that it is about to hit vehicle 100B or that there is a high probability that it will hit vehicle 100B, then vehicle 100C will immediately transmit out that prediction (for the benefit of vehicle 100A and for the benefit of vehicle 100D and the car behind vehicle 100D). But vehicle 100B can also receive that information and benefit from it. Even though vehicle 100B is expected to learn about being hit from behind by vehicle 100C using its own sensors, it may be the case that its sensors are slow to respond by some reason or even that its sensors had failed and cannot detect the forthcoming accident. In other words, the accident alert by vehicle 100C acts as a backup for vehicle 100B's sensors and may either increase vehicle 100B's response time or may even be the only source for alerting vehicle 100B.

General comments—It should be noted that while the explanations and examples in this disclosure are presented in the context of cars driving in a convoy, the invention is also useful in the context of cars driving in other configurations. It should also be noted that while the explanations and examples in this disclosure are presented in the context of driverless cars, the invention is also useful in the context of regular human-driven cars.

Figure 4:
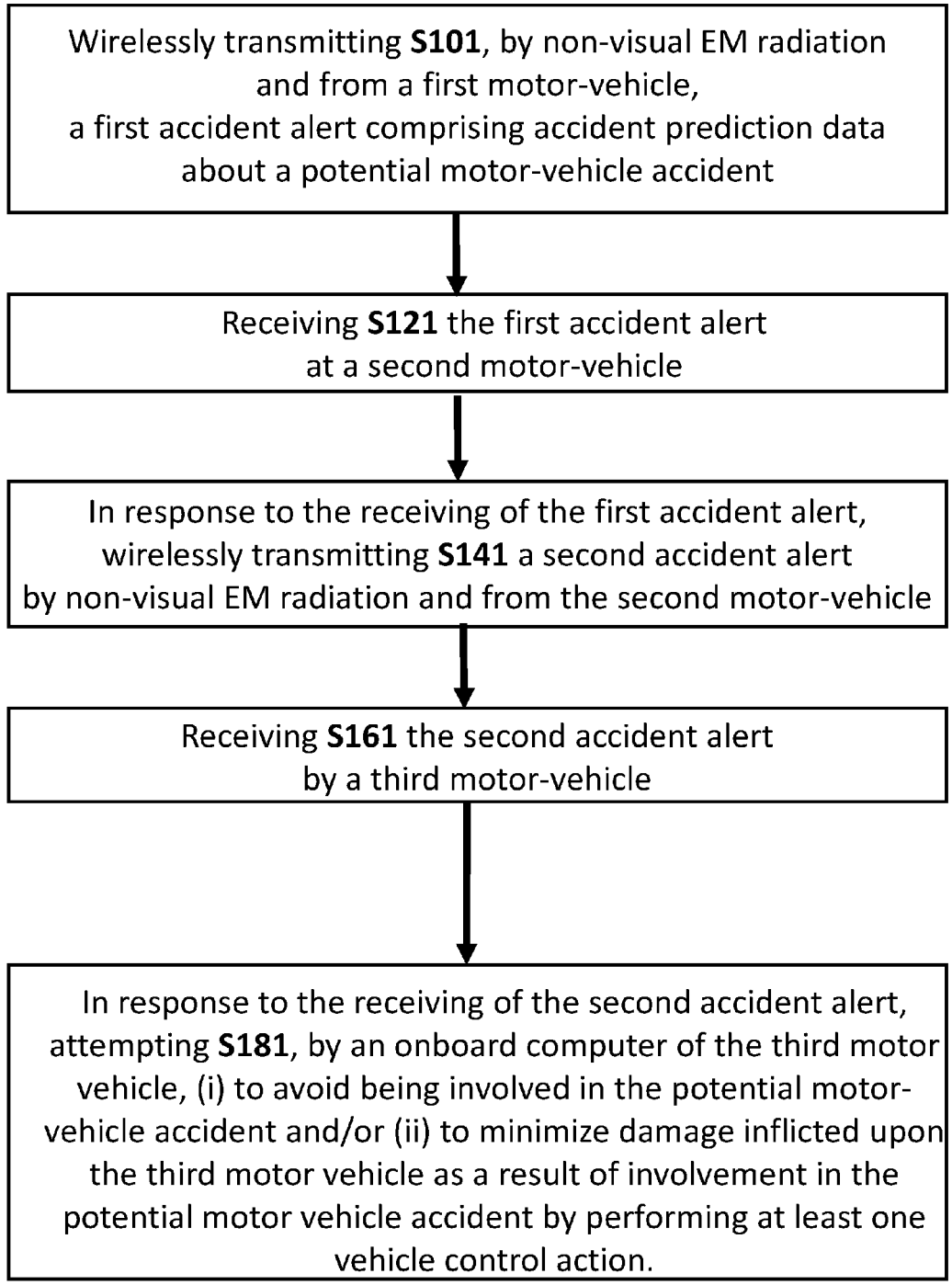
Figure 5:
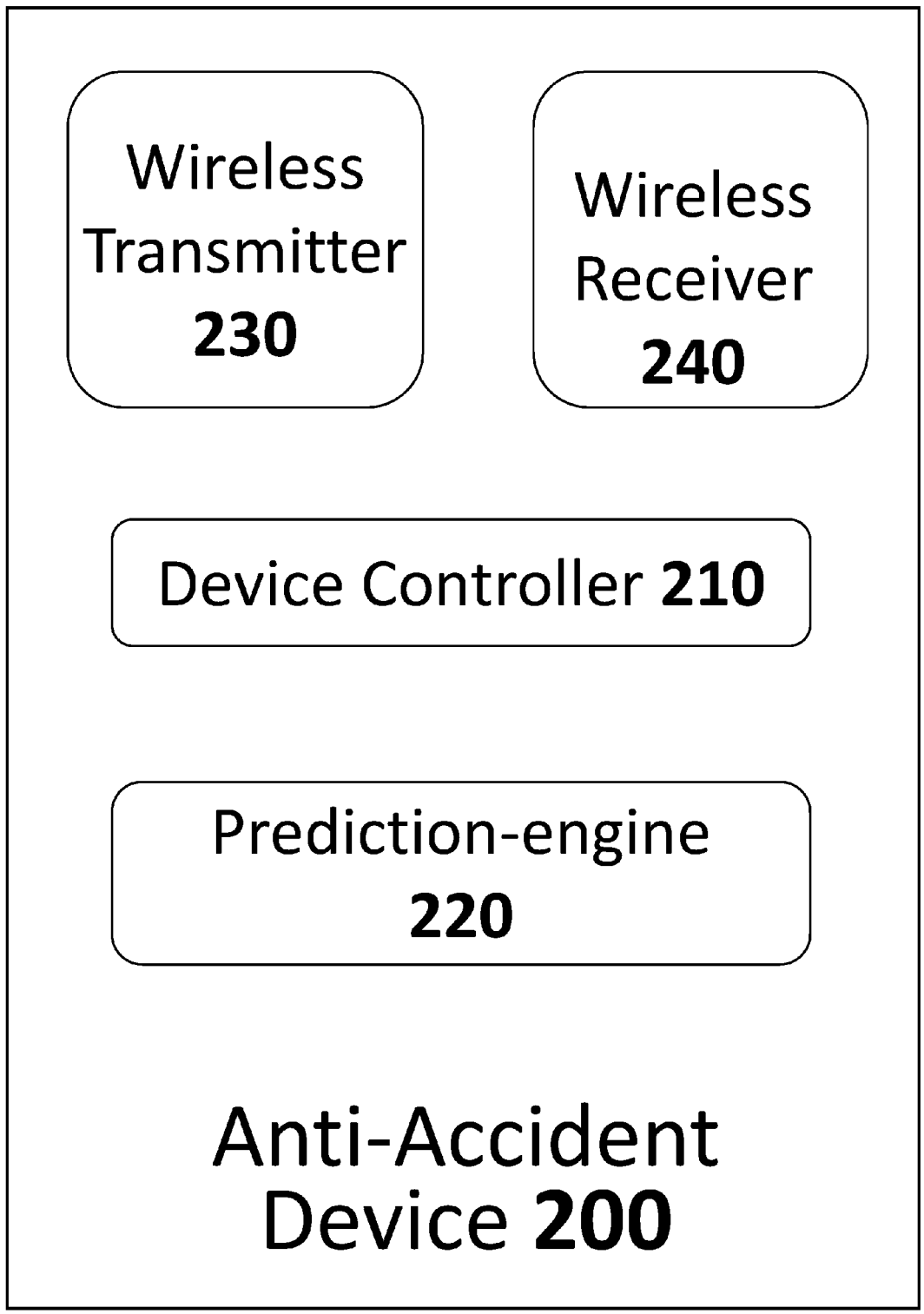
FIG. 5 is a block diagram of an anti-accident device according to some embodiments.

A Discussion of FIGS. 4-6

FIG. 4 illustrates a method for attempting to avoid a potential motor-vehicle accident according to some embodiments. FIG. 5 illustrates an exemplary anti-accident device 200 which may be disposed into any motor-vehicle that participates in the method of FIG. 4. The anti-accident device 200 of FIG. 5 temporarily or permanently resides within a host motor-vehicle and thus is an onboard device of the motor-vehicle. In the illustrated example of FIG. 5, the anti-accident device 200 includes (i) a prediction-engine 220 for processing factual input data about a plurality of motor-vehicles and computationally predicting an accident scenario, thereby generating output prediction data of a potential accident; (ii) a wireless transmitter 230 for wirelessly transmitting non-visual EM signals; (iii) a wireless receiver 240 for wirelessly receiving non-visual EM signals; and (iv) a device controller 210 for sending control signals to onboard vehicle controls of the host motor-vehicle where the anti-accident device resides.

In some embodiments, all components of the anti-accident device 200 are in wired communication with each other and/or in wired communication with at least one of the onboard vehicle controls of the host motor-vehicle.

Anti-accident device 200 may include a digital computer (not illustrated in FIG. 5). For example, either or both of device controller 210 and prediction engine 220 may be implemented as a digital computer executing software. In one example, device controller 210 and prediction engine 220 may be implemented by separate digital computers. In another example, a common digital computer executes software to provide the functionality of both device controller 210 and prediction engine 220.

Any element illustrated in FIG. 5 may include and/or be implemented in "electronic circuitry," defined above. Furthermore, the skilled artisan will appreciate that although wireless transmitter 230 and receiver 240 are illustrated as separate units, they may be implemented as a single transceiver unit.

The method of FIG. 4 requires three motor-vehicles, For example, a respective anti-accident device 200 respectively resides in each of the three motor-vehicles and respectively controls its host vehicle.

FIGS. 6A-6E and 8A-8E respectively illustrate two non-limiting use cases of the method of FIG. 4. Although these use cases are non-limiting, the method of FIG. 4 will first be explained with reference to FIGS. 6A-6E. The use case of FIGS. 6A-6E illustrates a convoy of motor-vehicles travelling in the same direction where initially (FIG. 6A) (i) motor-vehicles 100B and 100C are travelling at the same speed and (ii) front motor-vehicle 100A is travelling at a lower speed.

Figure 6A:
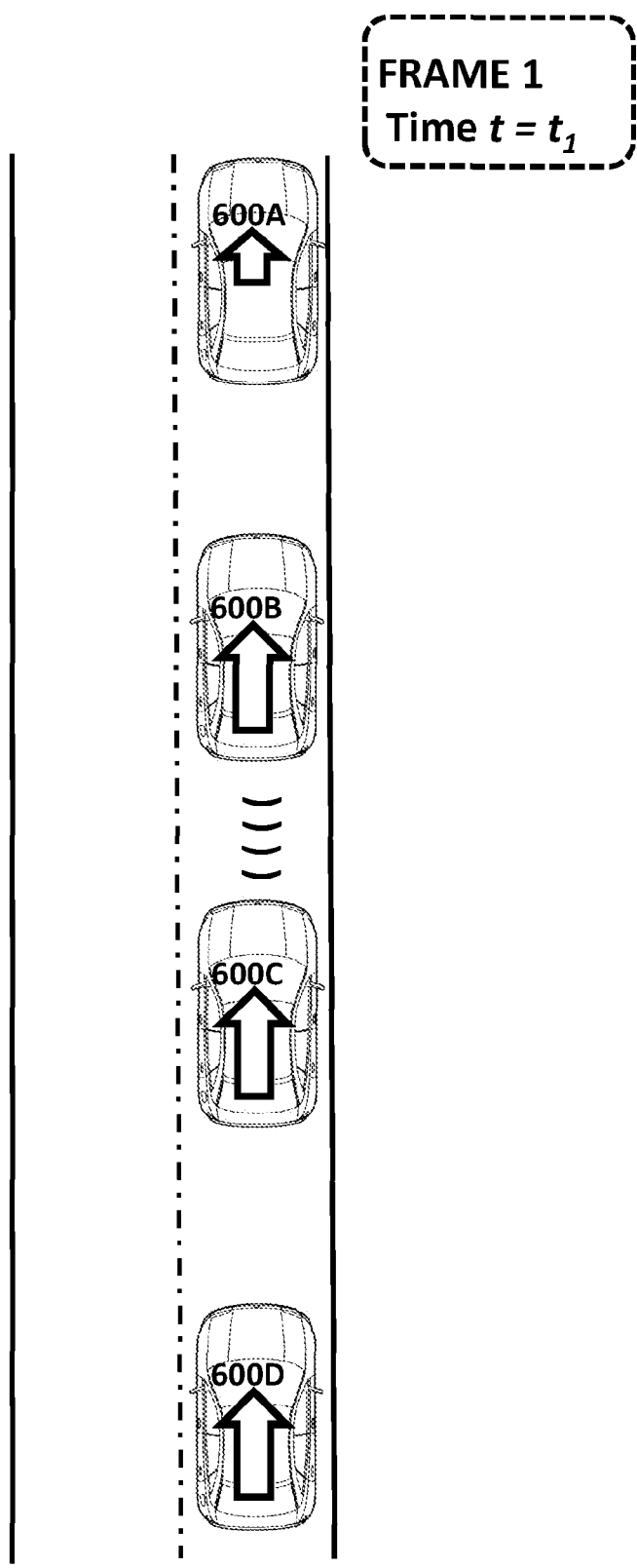
FIGS. 6A-6E, 8A-8E, 10A-10E and 12 illustrate various use-cases according to some embodiments of the invention.
Figure 6B:
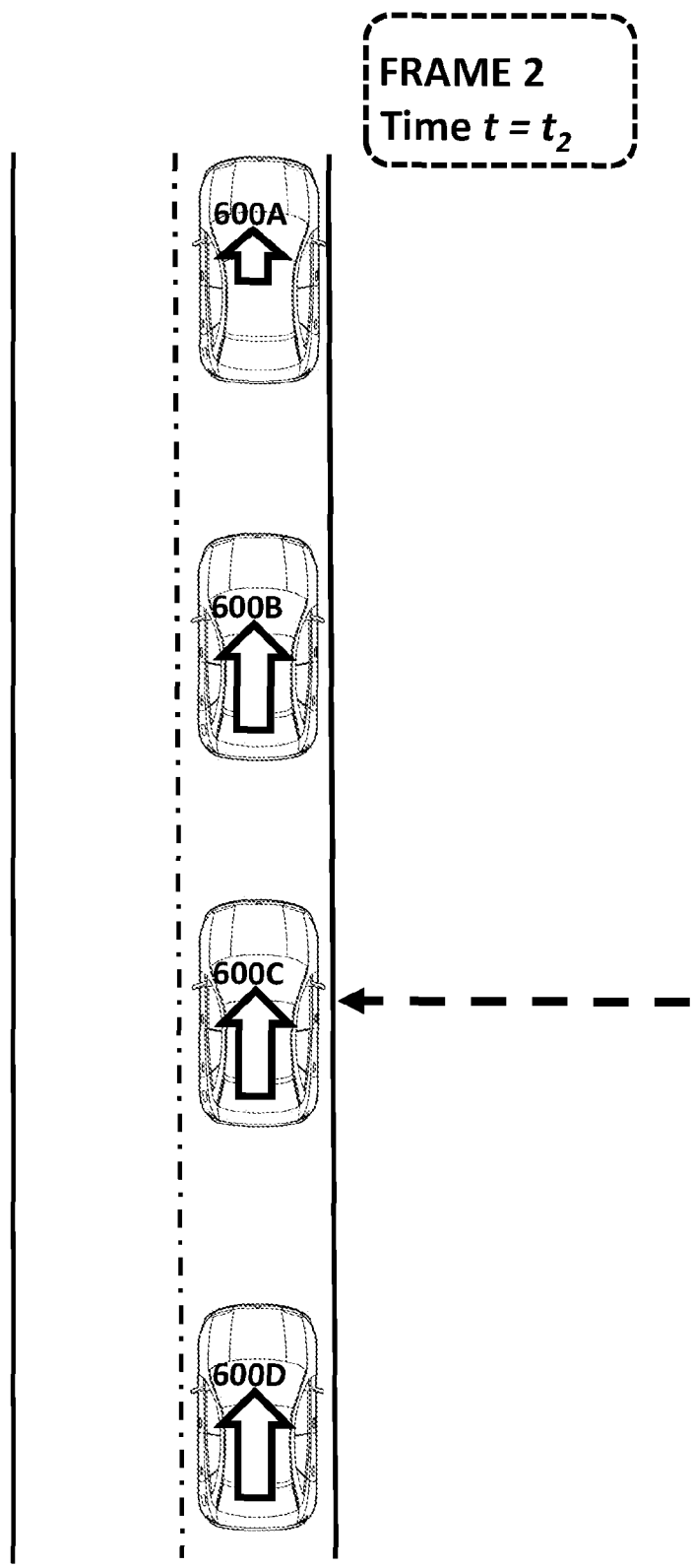

In the non-limiting example of FIG. 6A, a second motor-vehicle 100C follows a first motor-vehicle 100B, and a third motor-vehicle 100D follows the second motor-vehicle 100C. The first motor-vehicle 100B follows a fourth motor-vehicle 100A.

In step S101 of FIG. 4, a first accident alert is wirelessly transmitted by non-visual EM radiation from a first motor-vehicle (e.g. vehicle 100B of FIG. 6A)—for example, by an onboard wireless transmitter 230 of an onboard anti-accident device 200 that resides in vehicle 100B. The first accident alert comprises accident prediction data about a potential motor-vehicle accident—for example, a potential accident where vehicle 100B hits vehicles 100A from behind. For example, the accident prediction data is generated by an onboard computer (i.e. by an onboard prediction engine 220 implemented at least in part by a digital computer) of the first vehicle 100B according to factual input data—e.g. input data about the relative speeds of the first 100B vehicle and fourth vehicle 100A.

In this example, at least some of the factual input data employed for generating this accident prediction data may be unavailable to a second motor-vehicle 100C. For example, the second motor-vehicle 100C may include front-looking sensors that monitor a speed of a vehicle 100B immediately in front of the second motor-vehicle 100C—these front-looking sensors may not be able to monitor a speed of the fourth vehicle 100A. For example, a presence of first vehicle 100B may block an optical path between the second vehicle 100C and the fourth vehicle 100A.

In some embodiments, some or all of the accident prediction data of the first accident alert may be computed by an onboard computer and/or prediction engine of an anti-accident device residing in the first vehicle.

In step S121 (e.g. see FIG. 6B) the first accident alert is received at the second motor-vehicle (e.g. vehicle 100C)—for example, by an onboard wireless receiver 240 of an onboard anti-accident device 200 that resides in the second vehicle (e.g. vehicle 100C). Optionally, an onboard computer (e.g. of a respective anti-accident device 200) on the second motor-vehicle (e.g. vehicle 100C) analyzes the content of the first accident alert—a discussion about content of the accident alerts and analysis of content thereof is provided below.

Figure 6C:
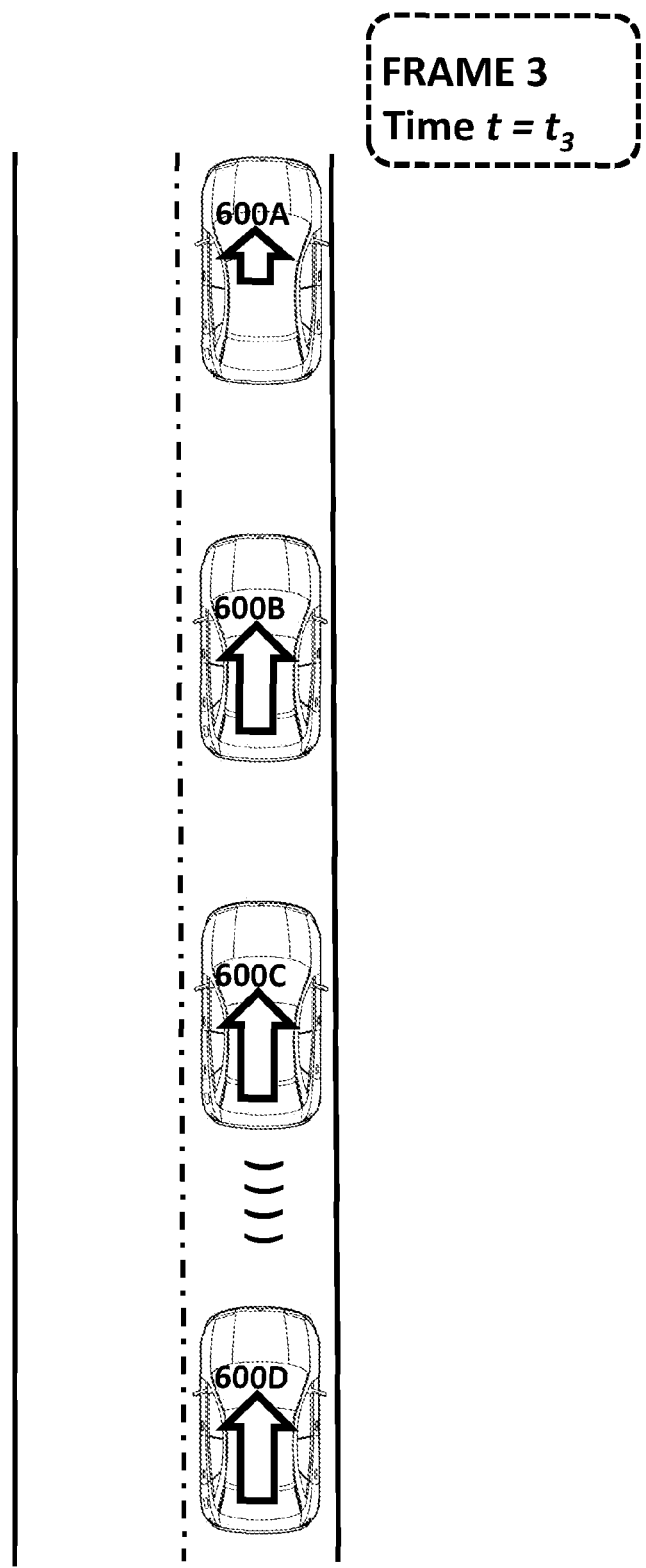
Figure 6D:
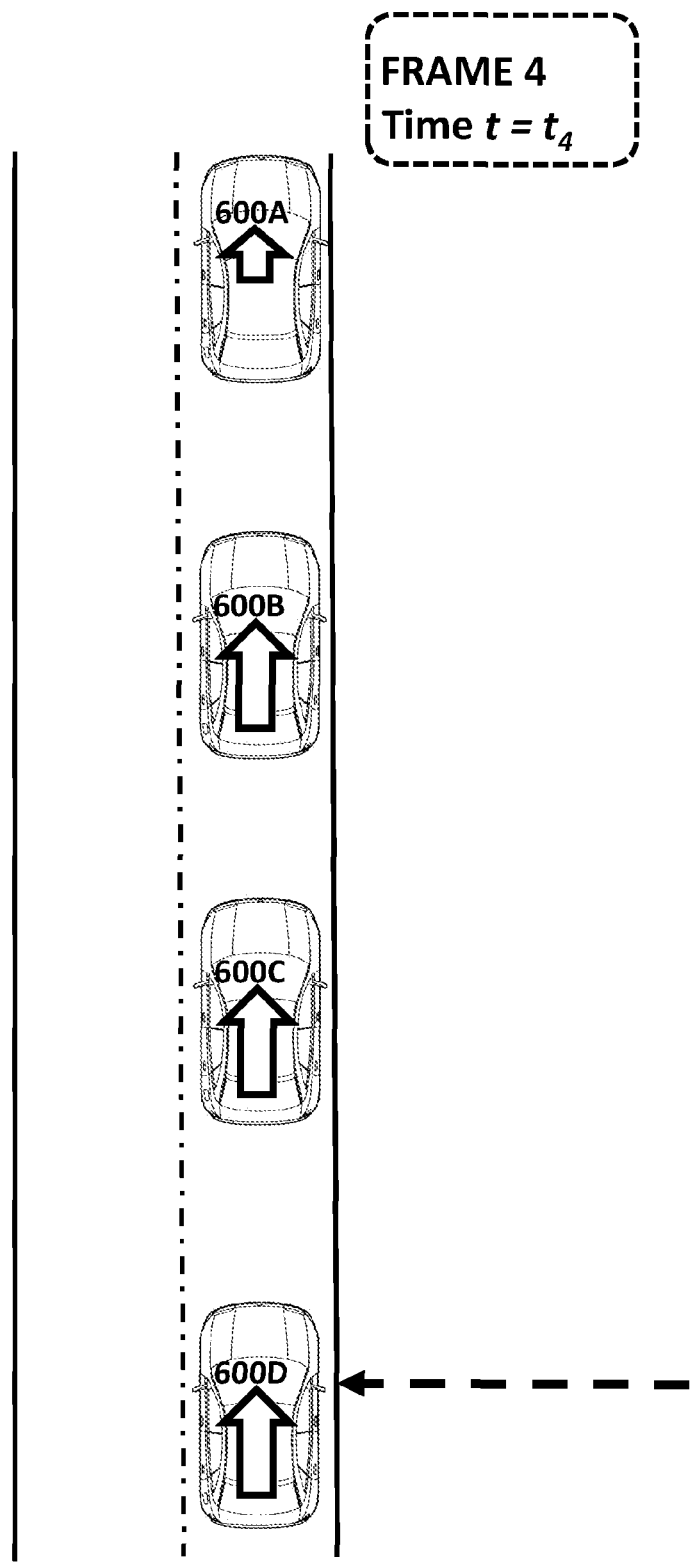

Step S141 is performed in response to the receiving of the first accident alert at the second motor-vehicle (e.g. vehicle 100C). In step S141, a second accident alert is wirelessly transmitted by non-visual EM radiation from the second motor-vehicle—for the non-limiting use case of FIGS. 6A-6E, step S141 is illustrated in FIG. 6C. As will be discussed below, the content of the first and second accident alerts may be the same, in which case the second vehicle 100C relays only the content received in the first accident alert. In another example, the content of the first and second accident alerts may be different—e.g. an onboard computer of the second vehicle may, for example, update an outcome prediction related to the first accident alert. For example, onboard instruments of the second vehicle may acquire additional factual input data which is used to refine accident prediction data associated with the first accident alert, and this refined prediction data may be included in the second accident alert.

In step S161 (e.g. see FIG. 6D) the second accident alert is received at the third motor-vehicle (e.g. vehicle 100D)—for example, by an onboard wireless receiver 240 of an onboard anti-accident device 200 that resides in the third motor-vehicle (e.g. vehicle 100D).

Step S181 is performed in response to the receiving of the second accident alert at the third motor-vehicle (e.g. vehicle 100D). In step S181, an onboard computer (e.g. prediction-engine 220 that is implemented by a digital computer executing software) of the third motor-vehicle (e.g. vehicle 100D) performs at least one vehicle control action—for example, by sending control signals to onboard vehicle controls of the host motor-vehicle where the anti-accident device 200 resides. The vehicle control action(s) are performed so as to attempt (i) to avoid being involved in the potential motor-vehicle accident and/or (ii) to minimize damage inflicted upon the third motor-vehicle as a result of involvement in the potential motor-vehicle accident by performing at least one vehicle control action.

Figure 6E:
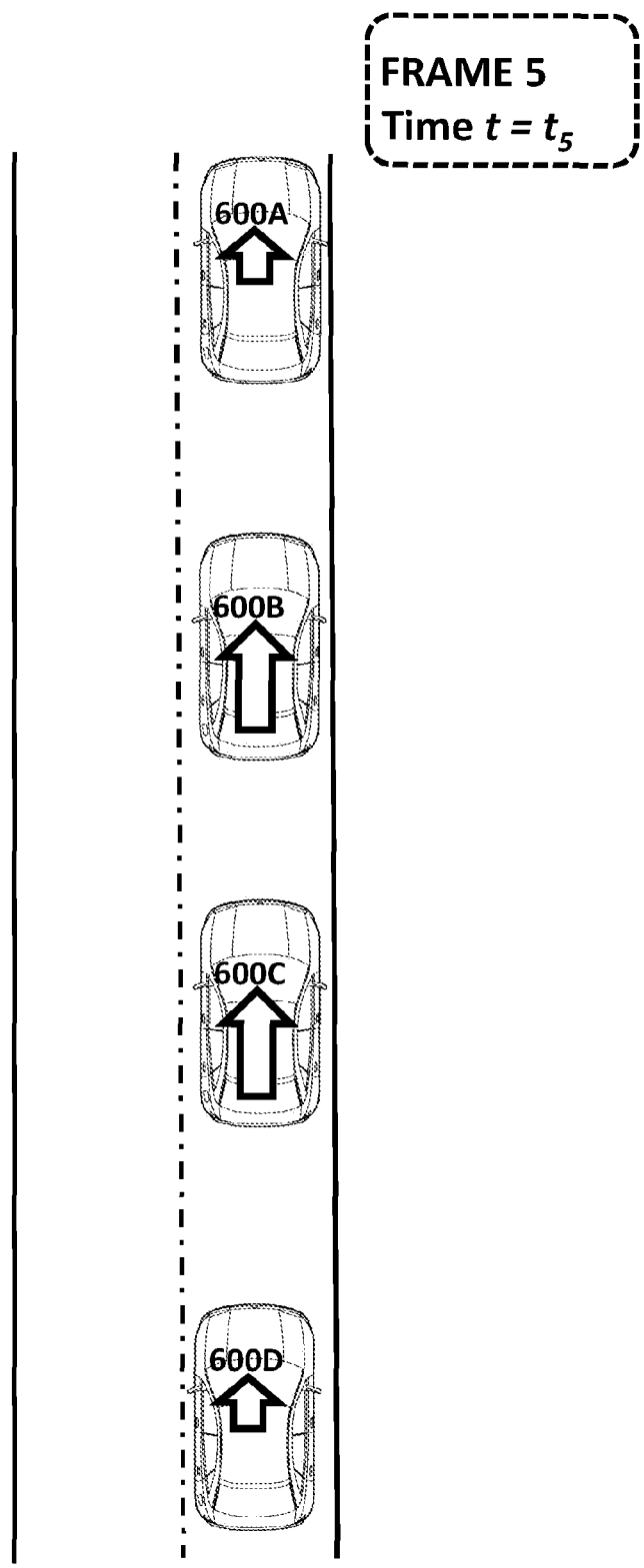

Thus, FIG. 6E relates to one implementation of step S181 for the particular use-case of FIGS. 6A-6E. In this example, to avoid being involved in the potential accident between first 100B and second 100C vehicles, the third vehicle 100D may brake and/or decelerate—this is illustrated in FIG. 6E where the velocity arrow on vehicle 100D is of lesser magnitude than the velocity arrow on vehicle 100D in FIG. 6D.

In the above example, the trigger of the seconding of the first accident alert was the fourth vehicle 600A—i.e. the potential of an accident between the first 600B and fourth 600A vehicles. In this sense, the second vehicle 600C may take advantage of the sensors of vehicle 600B which accesses input factual data that may not be available to the second vehicle 600C (e.g. due to a presence of the first 600B vehicle blocking a line-of-sight from the second vehicle 600C to the fourth vehicle 600A).

In another example, an action performed by the first 600B vehicle itself may trigger the sending of the first accident alert. For example, the first vehicle 600B may drive over an unexpected patch of bad road which causes the first vehicle 600B to decelerate. First vehicle 600B then sends an accident alert warning second vehicle 600C of a potential accident that might occur if second vehicle 600C does not slow down. In this example, the deceleration of first vehicle 600B may eventually be detectable by sensors of the second vehicle 600C, but there is an advantage in alerting second vehicle 600C by first vehicle 600B because first vehicle 600B may be aware of the potential accident earlier than the sensors of second vehicle 600C.

The method of FIG. 4 may be performed at any speed—in some embodiments, an elapsed time between commencement of step S101 and performance of step S181 is at most 500 milliseconds or at most 300 milliseconds or at most 100 milliseconds.

Anti-Accident Devices and Some Embodiments of the Method of FIG. 4

In some embodiments of the invention, a respective anti-accident device 200 resides (i.e. temporarily or permanently) on every motor vehicle of the three motor-vehicles referred to in the method of FIG. 4. Each anti-accident device 200 is capable of providing all the functionality required from the first, second and third motor vehicles of the method of FIG. 4—the particular functionality depends on the vehicle where the anti-accident device resides.

Thus, when the anti-accident device 200 resides on the first vehicle, the anti-accident device provides the following functionality: in response to a predicting, by the prediction engine (i.e. of the anti-accident device 200 on the first vehicle) of an accident scenario about a first potential motor-vehicle accident (the 'first potential motor-vehicle accident' corresponds to the 'potential motor vehicle accident' of steps S101 and S181), the device controller (i.e. of the anti-accident device 200 on the first vehicle) transmits (see step S101 of FIG. 4), via the wireless transmitter (i.e. of the anti-accident device 200 on the first vehicle), a first outgoing accident alert comprising accident prediction data about the first potential motor-vehicle accident.

When the anti-accident device 200 resides on the second vehicle of FIG. 4, the anti-accident device provides the following functionality: in response to a receiving (see step S121), via the wireless receiver (i.e. of the anti-accident device 200 on the second vehicle), of a first incoming accident alert (i.e. the 'first incoming accident alert' corresponds to the 'first accident alert' of steps S121 and S141 of FIG. 4) comprising accident prediction data about a second potential motor-vehicle accident (the 'second potential motor-vehicle accident' corresponds to the 'potential motor vehicle accident' of steps S101 and S181), the device controller (i.e. of the anti-accident device 200 on the second vehicle) transmits, via the wireless transmitter (i.e. of the anti-accident device 200 on the second vehicle), a second outgoing accident alert (i.e. the 'second outgoing accident alert' corresponds to the 'second accident alert' of steps S141 and S161 of FIG. 4) comprising accident prediction data for the second potential motor-vehicle accident.

When the anti-accident device 200 resides on the third vehicle of FIG. 4, the anti-accident device provides the following functionality: in response to a receiving, via the wireless receiver (i.e. of the anti-accident device 200 on the third vehicle), of a second incoming accident alert (i.e. the 'second incoming accident alert' corresponds to the 'second accident alert' of steps S141 and S161 of FIG. 4) comprising accident prediction data about a third potential motor-vehicle accident (the 'third potential motor-vehicle accident' corresponds to the 'potential motor vehicle accident' of steps S101 and S181) between two or more external motor-vehicles (i.e. in this case, each of the external motor vehicles is a vehicle other than the 'third' motor vehicle of FIG. 4—in FIGS. 6A-6E vehicles 600A-600C are the external vehicles; in FIGS. 8A-8E vehicles 120B-120D are the external vehicles), the device controller (i.e. of the anti-accident device 200 on the third vehicle) sends control signals to one or more onboard vehicle controls of the host motor-vehicle (i.e. the host motor vehicle corresponds to the third motor vehicle of FIG. 4) so as (A) to avoid involvement, of the host motor-vehicle (i.e. which corresponds to the third motor vehicle of FIG. 4—e.g. vehicle 600D of FIGS. 6A-6E or vehicle 120A of FIGS. 8A-8E), in the third potential motor-vehicle accident; and/or (B) to reduce (e.g. minimize) damage inflicted upon the host motor-vehicle (i.e. which corresponds to the third motor vehicle of FIG. 4) as a result of involvement in the third potential motor-vehicle accident by performing at least one vehicle control action.

Figure 7A:
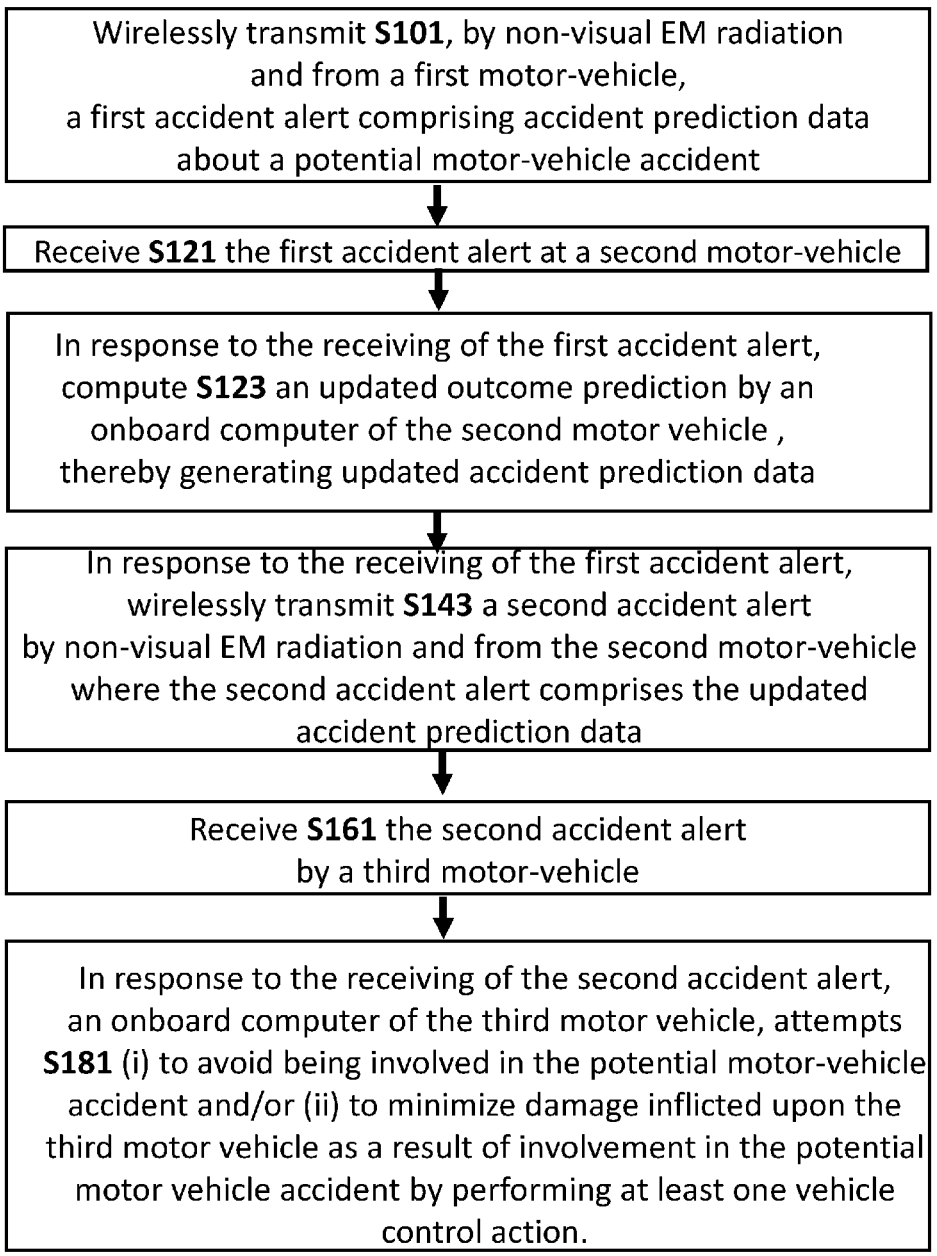
Figure 7B:
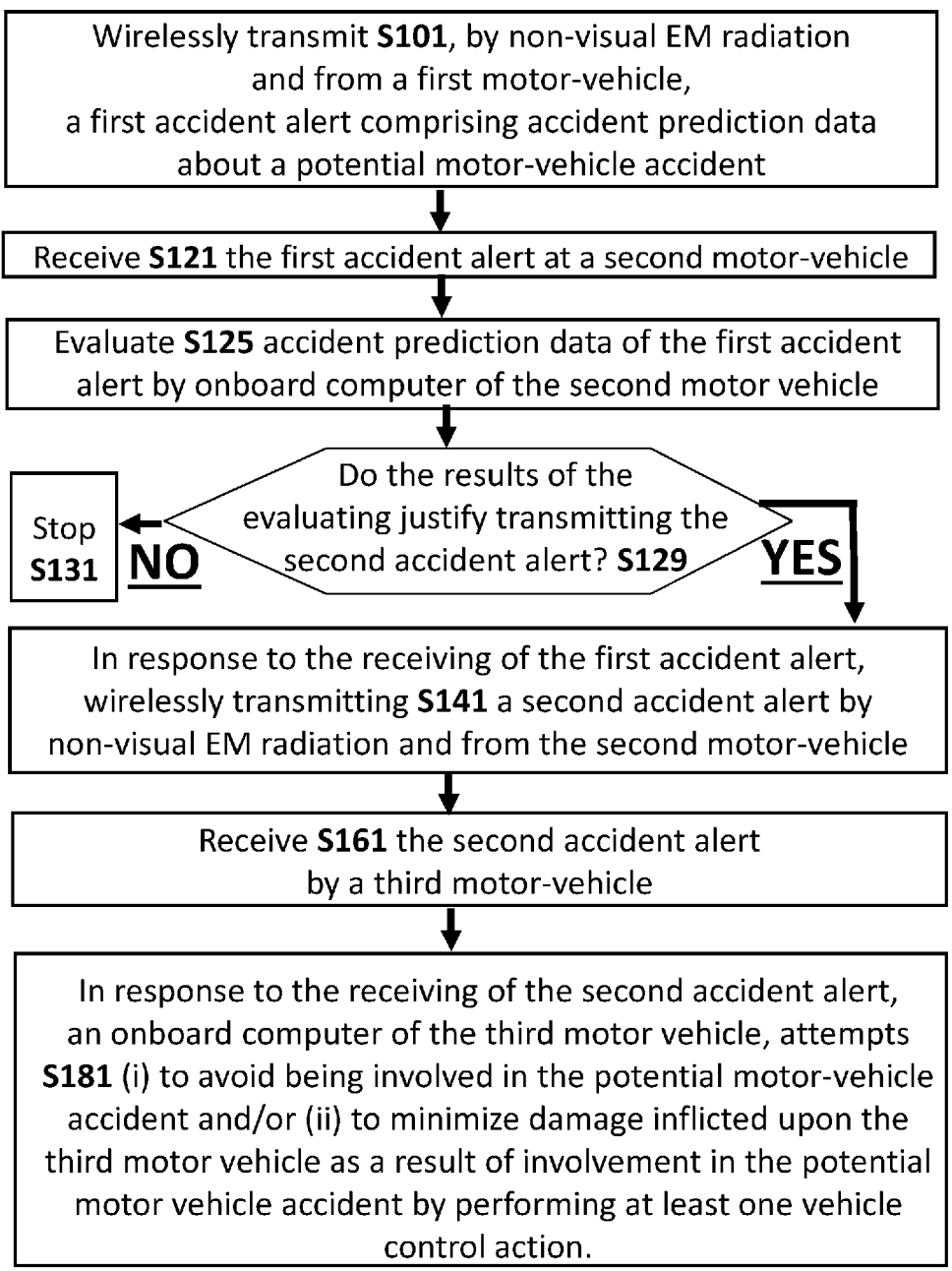

A Discussion of FIGS. 7A-7B

FIG. 7A is similar to FIG. 4 but (i) includes an extra step S123 in which in response to the receiving of the first accident alert, computing an updated outcome prediction by an onboard computer of the second motor-vehicle, thereby generating updated accident prediction data and (ii) replaces step S141 of FIG. 4 with step S143 of FIG. 7A.

In some embodiments, (i) one or more onboard computer(s) of the first motor-vehicle (vehicle 600B of FIGS. 6A-6E) may compute accident prediction data of the first accident alert from a first set of factual input data; and (ii) one or more onboard computer(s) of the second motor-vehicle computes accident prediction data of the second accident alert from a second set of factual input data that includes factual input data not present within the first set of factual input data. In one example, when the onboard computer(s) of the first motor-vehicle computes a probability of collision between the first (vehicle 600B of FIGS. 6A-6E) and second (vehicle 600C of FIGS. 6A-6E) motor-vehicles, the onboard computer(s) of the first motor-vehicle may not have available information (or may have inaccurate information) about the braking capability of the second vehicle 600C. As such, the computed probability of collision might not necessarily be accurate. In this first example, accurate information about the braking capability of the second vehicle 600C is available to the onboard computer of the second motor-vehicle (vehicle 600C of FIGS. 6A-6E) and this accurate information about braking capabilities of the second vehicle (vehicle 600C of FIGS. 6A-6E) may serve as factual input data in step S123.

In a second example, a device (e.g. employing sensing technology disclosed in US 20140297111 or US 20140365142) is (i) installed in the second vehicle 600C and (ii) is in wired communication, within the second vehicle 600C, with an onboard computer of the second motor vehicle 600C. When the onboard computer(s) of the first motor-vehicle computes a probability of collision between the first (vehicle 600B of FIGS. 6A-6E) and second (vehicle 600C of FIGS. 6A-6E) motor-vehicles, the onboard computer(s) of the first motor-vehicle may not have available information (or may have inaccurate information) about the blood alcohol level of the driver of the second vehicle 600C (e.g. this may be descriptive of a reaction-time of the driver of the second vehicle 600C). As such, the computed probability of collision might not necessarily be accurate. In this second example, accurate information about the blood alcohol level of the driver of the second vehicle 600C is available to the onboard computer of the second motor-vehicle (vehicle 600C of FIGS. 6A-6E) and this accurate information about blood alcohol level of the driver of the second vehicle (vehicle 600C of FIGS. 6A-6E) may serve as factual input data in step S123.

In step S143, the second accident alert transmitted from the second motor-vehicle (vehicle 600C of FIGS. 6A-6E) comprises the updated accident prediction data based upon the accurate braking capability data of the second vehicle 600C or the blood alcohol level of the driver of the second vehicle 600C.

FIG. 7B is similar to FIG. 4 but includes extra steps S125, S129 and S131. FIG. 7B relates to some examples where the accident prediction data of the received first accident alert is evaluated at the second motor-vehicle and the transmitting of the second accident alert from the second motor-vehicle is contingent upon the results of the evaluation.

In step S125, onboard computer of the second motor-vehicle evaluates S125 accident prediction data of the first accident alert—for example, to determine if a risk of an accident exceeds a risk-threshold or if a severity of an accident exceeds a severity-threshold. It may decide to refrain from performing step S141 for low-risk situations—for example, to avoid burdening the onboard computer of the third motor-vehicle or to avoid situations where the third motor-vehicle would needlessly change its velocity.

Thus, in step S129, it is determined (e.g. by onboard computer of the second motor-vehicle) if the results of the evaluating justify transmitting the second accident alert. If not (step S131) the second accident alert is not transmitted.

FIGS. 7A and 7B illustrate different potential modifications of the method of FIG. 4—the skilled artisan will appreciate that these modifications may be combined in a single method.

A Discussion of FIGS. 8A-8E

FIG. 4 was explained above for the particular example of FIGS. 6A-6E where the second motor 100B vehicle follows the first motor-vehicle 100A and the third motor-vehicle 100C follows the second motor-vehicle. This is not a limitation.

In the example of FIGS. 8A-8E, the second motor-vehicle 120B follows the third motor-vehicle 120A and the first motor-vehicle 120C follows the second motor-vehicle 120B. A fourth motor-vehicle 120D follows the first motor vehicle 120C.

In step S101 of FIG. 4, a first accident alert is wirelessly transmitted by non-visual EM radiation from a first motor-vehicle (e.g. vehicle 120C of FIG. 8A)—for example, by an onboard wireless transmitter 230 of an onboard anti-accident device 200 that resides in vehicle 120C. The first accident alert comprises accident prediction data about a potential motor-vehicle accident—for example, a potential accident where vehicle 120D hits vehicle 120C from behind and thus vehicles in front of vehicle 120C are at risk of being involved in a chain accident.

In step S121 (e.g. see FIG. 8B) the first accident alert is received at the second motor-vehicle (e.g. vehicle 120B)—for example, by an onboard wireless receiver 240 of an onboard anti-accident device 200 that resides in the second vehicle (e.g. vehicle 120B).

Figure 8A:
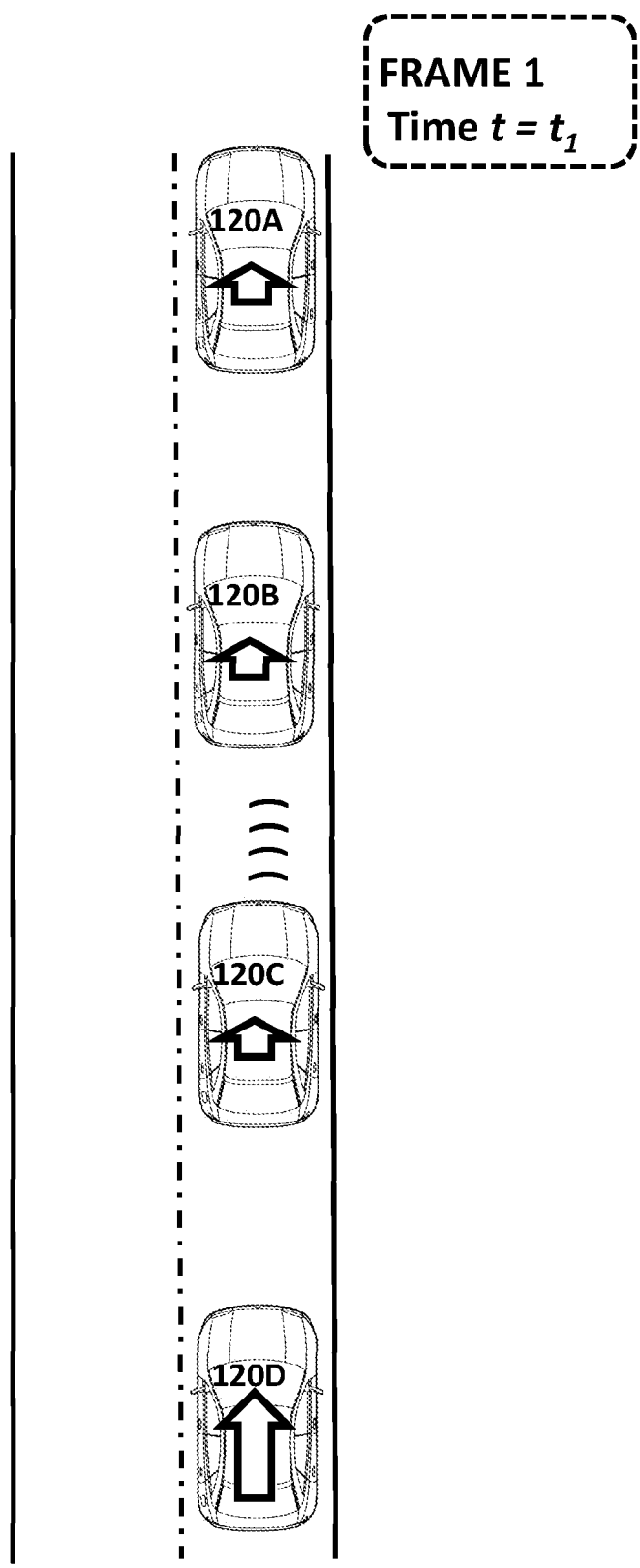
Figure 8B:
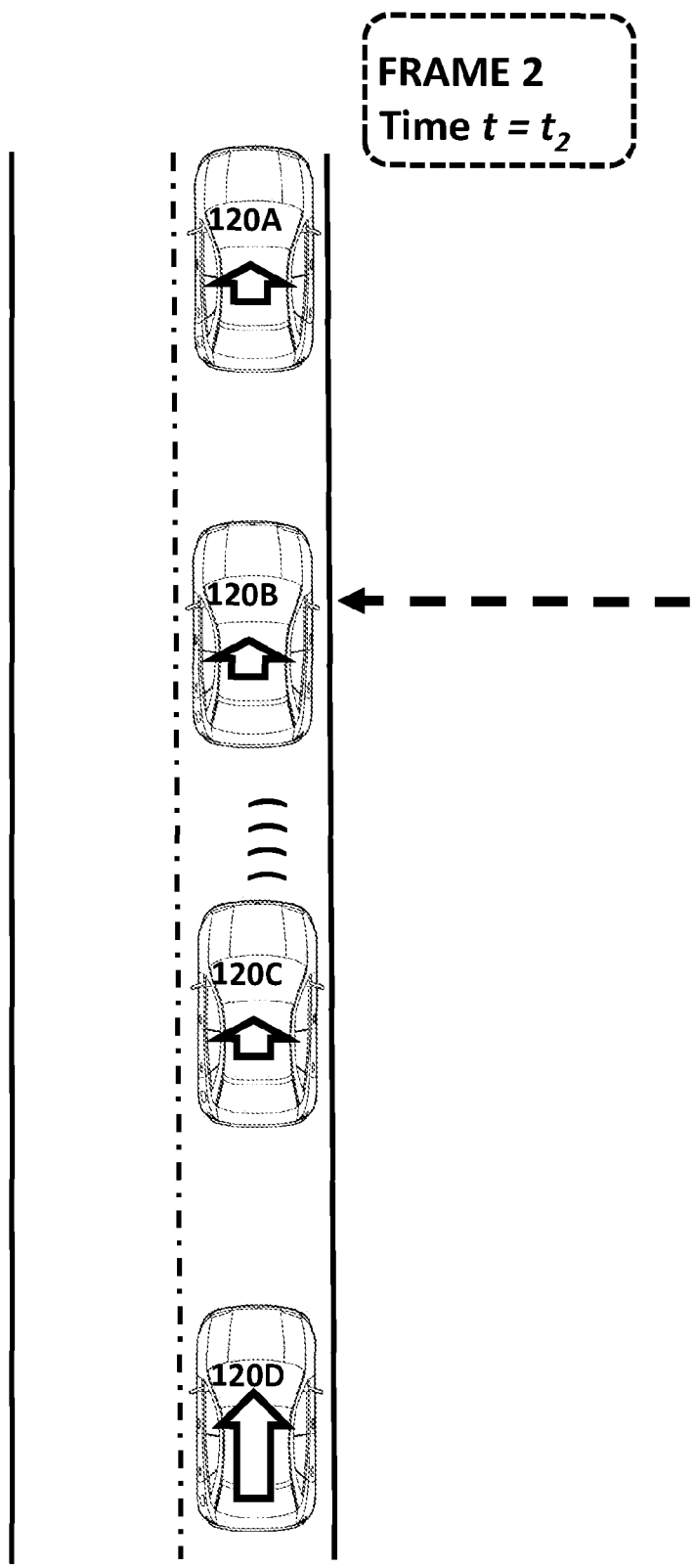
Figure 8C:
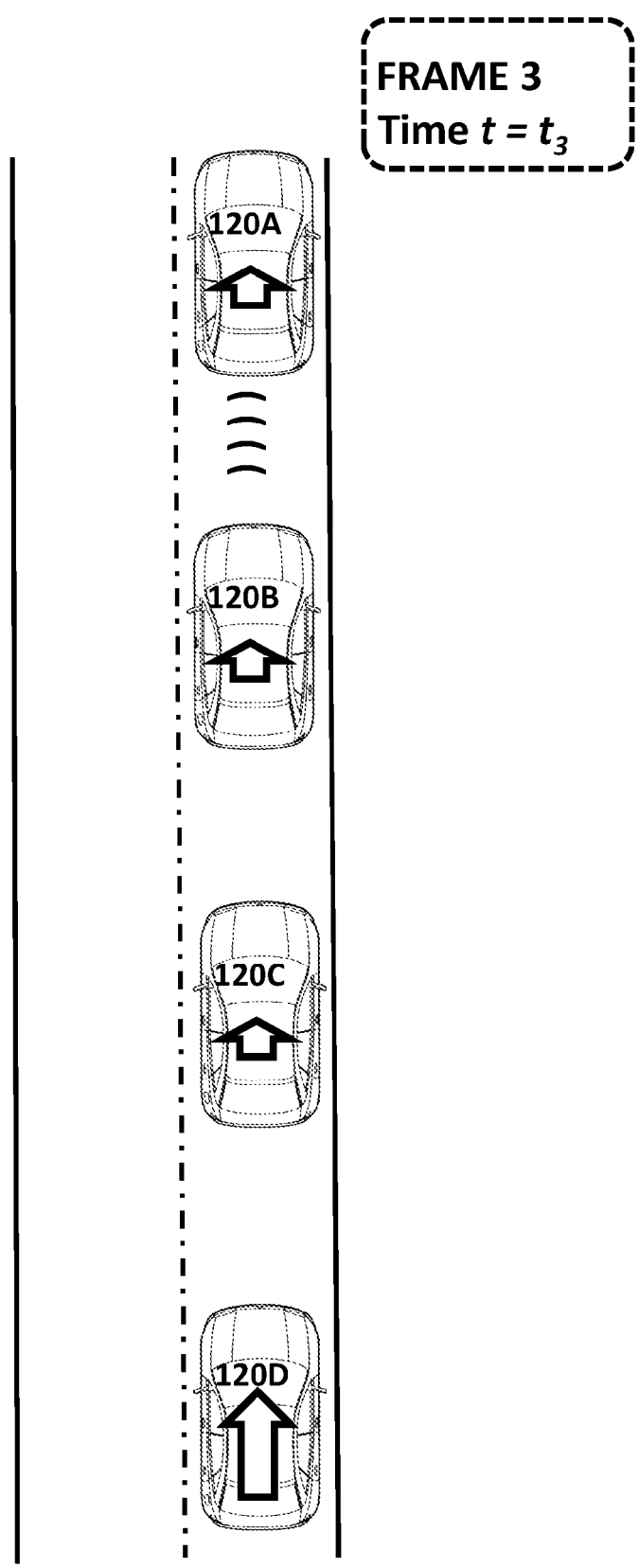
Figure 8D:
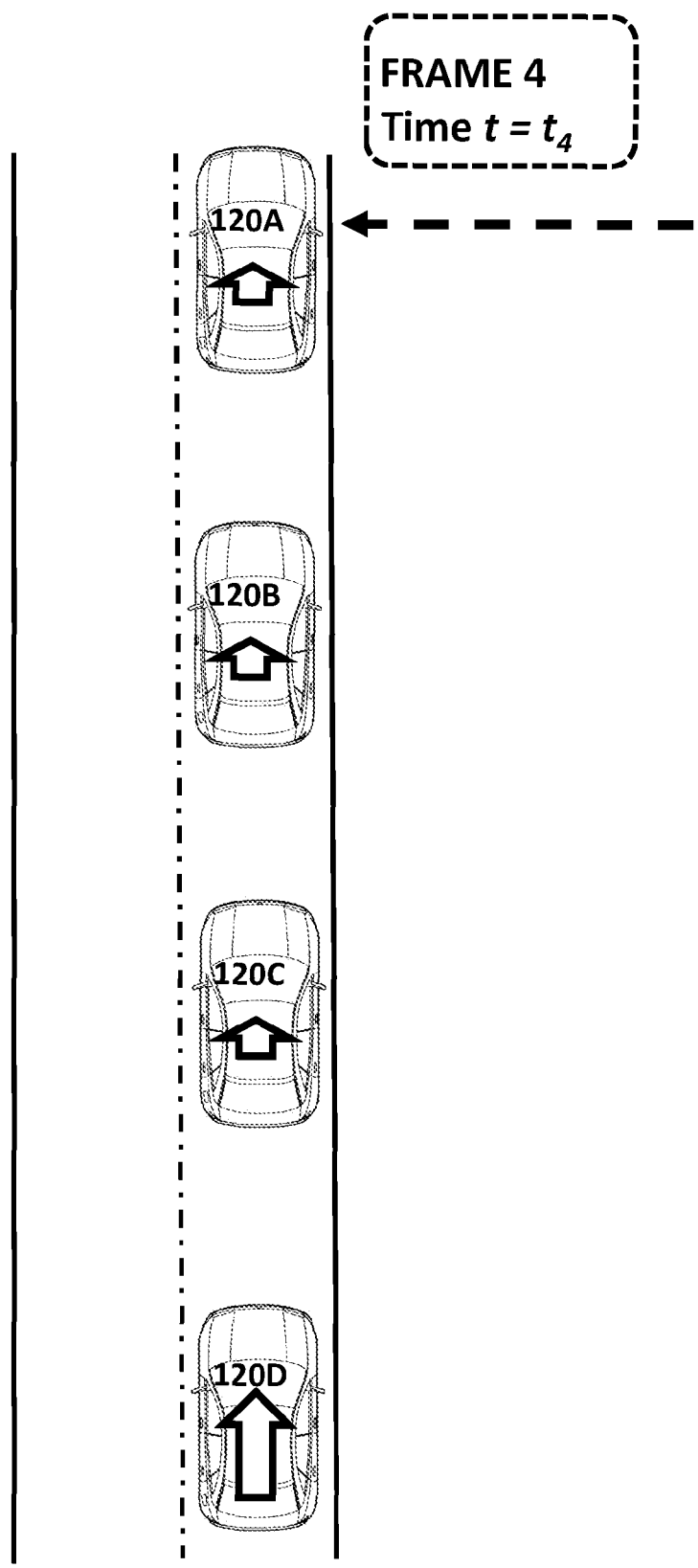

Step S141 in performed in response to the receiving of the first accident alert at the second motor-vehicle (e.g. vehicle 120B). In step S141, a second accident alert is wirelessly transmitted by non-visual EM radiation and from the second motor-vehicle 120B—for the non-limiting use case of FIGS. 8A-8E, step S141 is illustrated in FIG. 8C. For example, this second accident alert may indicate that there is a non-zero probability that the second car 120B will be hit from behind.

In step S161 (e.g. see FIG. 8D) the second accident alert is received at the third motor-vehicle (e.g. vehicle 120A)—for example, by an onboard wireless receiver 240 of an onboard anti-accident device 200 that resides in third motor-vehicle (e.g. vehicle 120A).

Step S181 is performed in response to the receiving of the second accident alert at the third motor-vehicle (e.g. vehicle 120A). In step S181, an onboard computer (e.g. prediction-engine 220 that is implemented by a digital computer executing software) of the third motor-vehicle (e.g. vehicle 120A) performs at least one vehicle control action—for example, turning to the right onto the shoulder of the road to avoid being involved in the chain accident that would be triggered by vehicle 120C hitting vehicle 120B from behind.

Figure 8E:
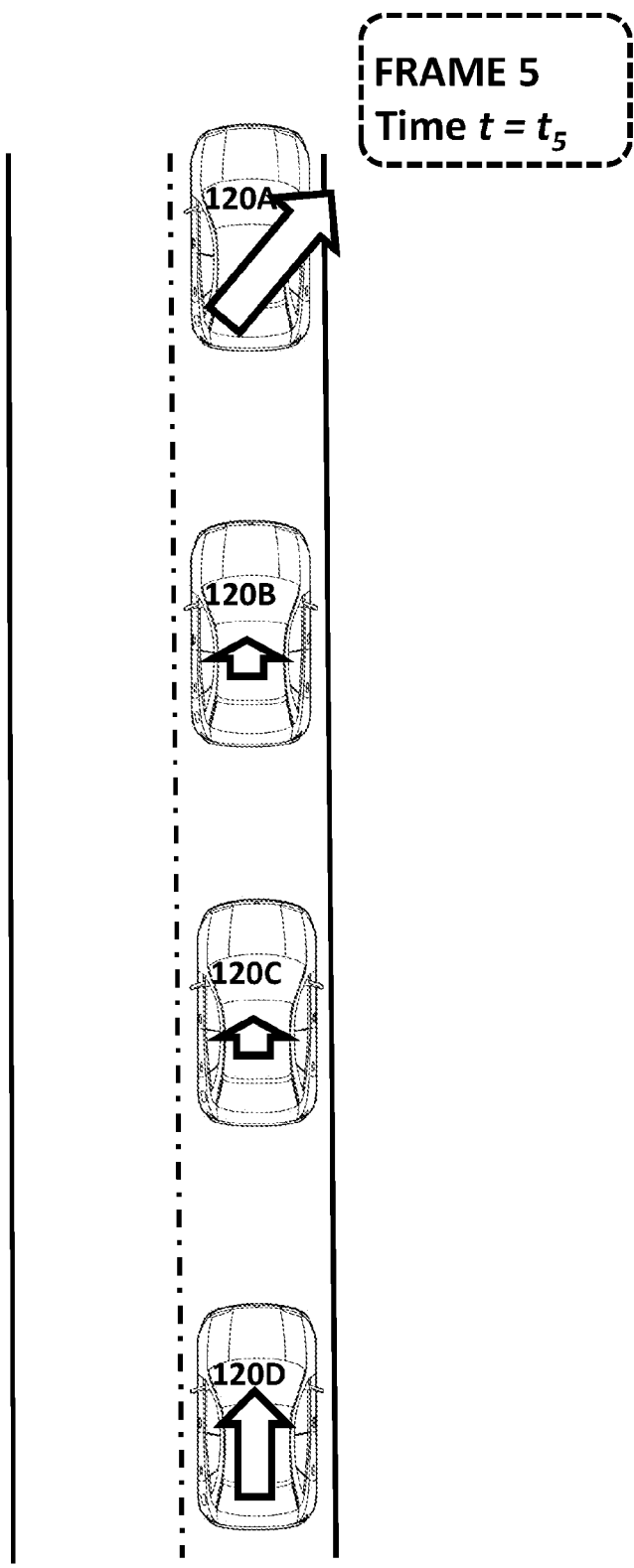

In FIG. 8E, vehicle 120A according to step S181 is moving forward and to the right towards the shoulder of the road.

A Discussion of FIGS. 9, 10A-10E

Figure 9:
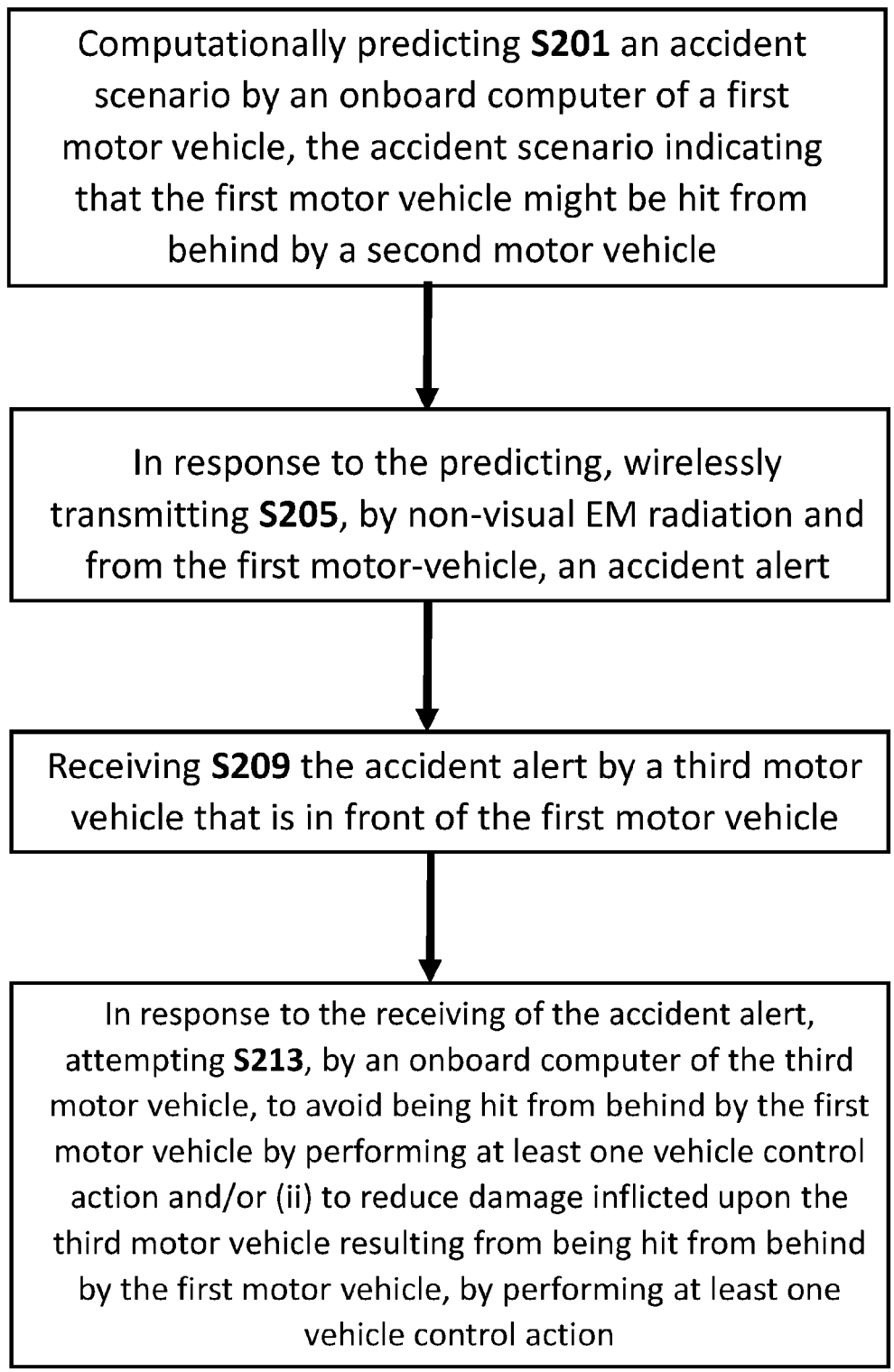

FIG. 9 is a flow chart of a method for responding to a prediction of a potential car accident involving first, second and third motor-vehicles. Without limitation, the method of FIG. 9 will be explained with reference to the non-limiting example of FIGS. 10A-10E—thus, in the non-limiting example, the first motor-vehicle is vehicle 100B, the second vehicle is vehicle 100C, and the third vehicle is vehicle 100A.

Thus, in this example, (i) the second motor 100C vehicle is behind the first 100B motor-vehicle and (ii) the first 100B motor-vehicle is behind the third 100A motor-vehicle.

In step S201 (e.g. see FIG. 10A), an onboard computer of a first motor-vehicle 100B computationally predicts an accident scenario indicating that the first 100B motor-vehicle might be hit from behind by a second motor-vehicle 100C.

In step S205 (e.g. see FIG. 10B), in response to the predicting, an accident alert is wirelessly transmitted, by non-visual EM radiation and from the first motor-vehicle 100B.

In step S209 (e.g. see FIG. 10C), the accident alert is received by a third motor-vehicle 100A that is in front of the first 100B motor-vehicle.

In step S213 (e.g. see FIG. 10D), in response to the receiving of the accident alert, an onboard computer of the third motor vehicle 100A attempts by performing at least one vehicle control action: (i) to avoid being hit from behind by the first motor-vehicle 100B and/or (ii) to reduce damage inflicted upon the third motor-vehicle 100A resulting from being hit from behind by the first motor-vehicle 100B.

Figure 10A:
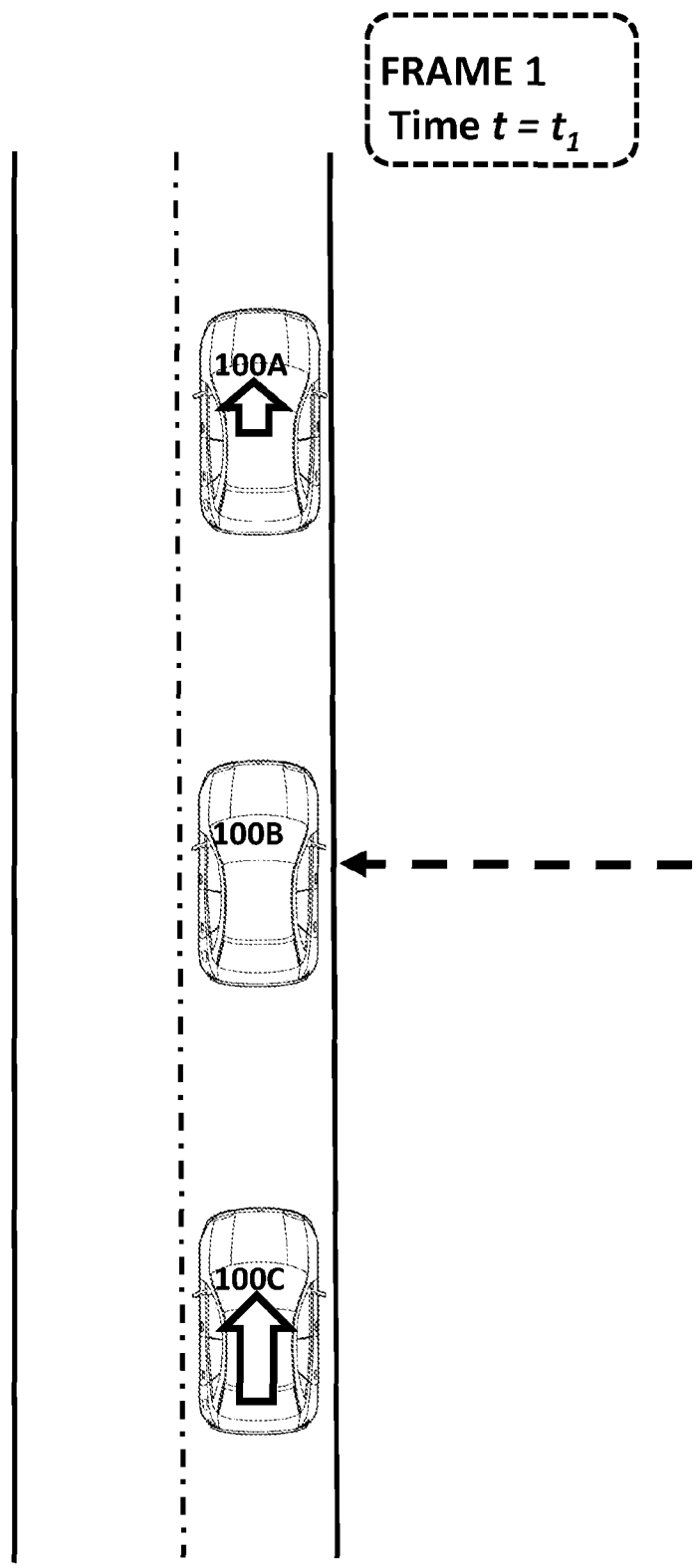
Figure 10B:
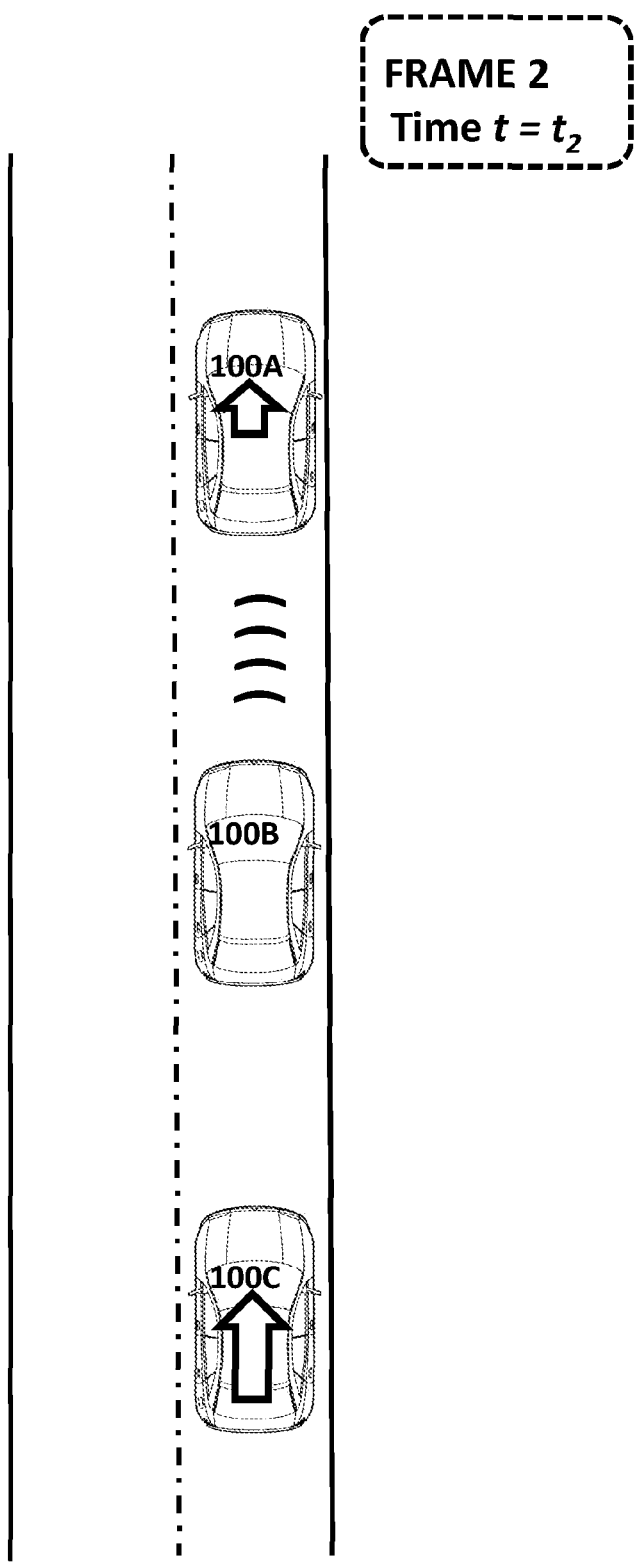
Figure 10C:
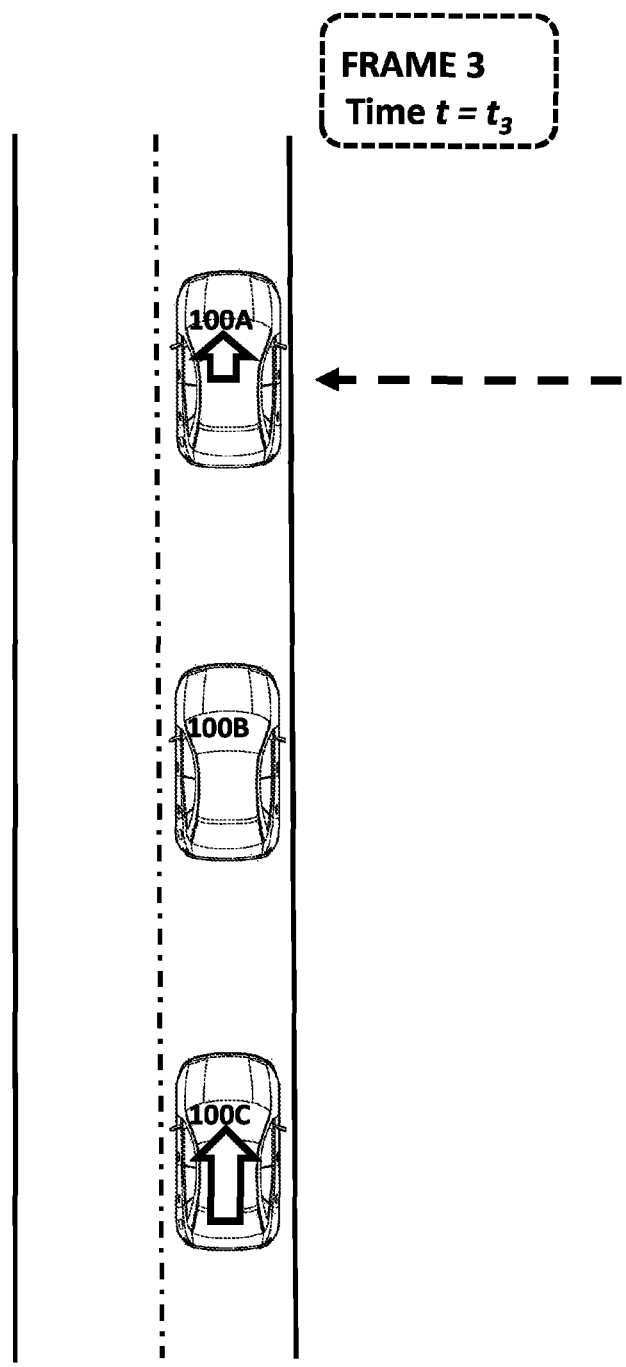
Figure 10D:
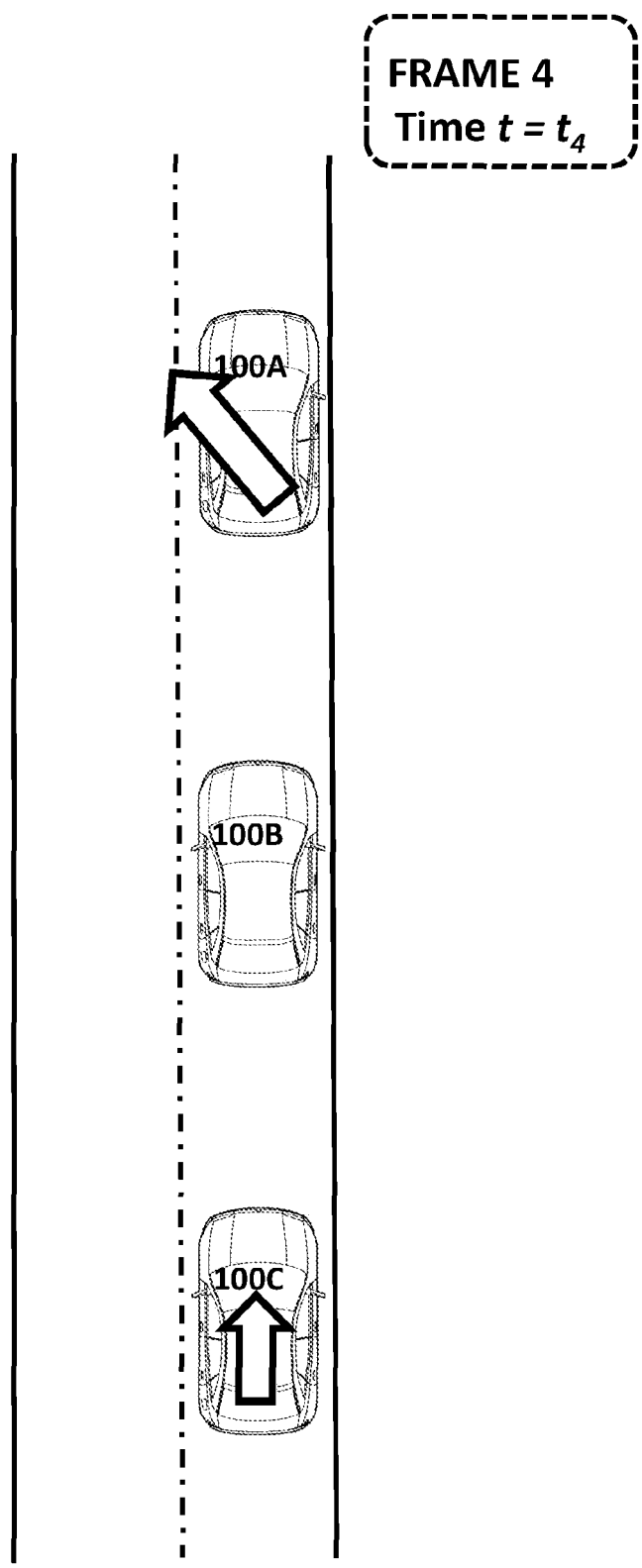
Figure 10E:
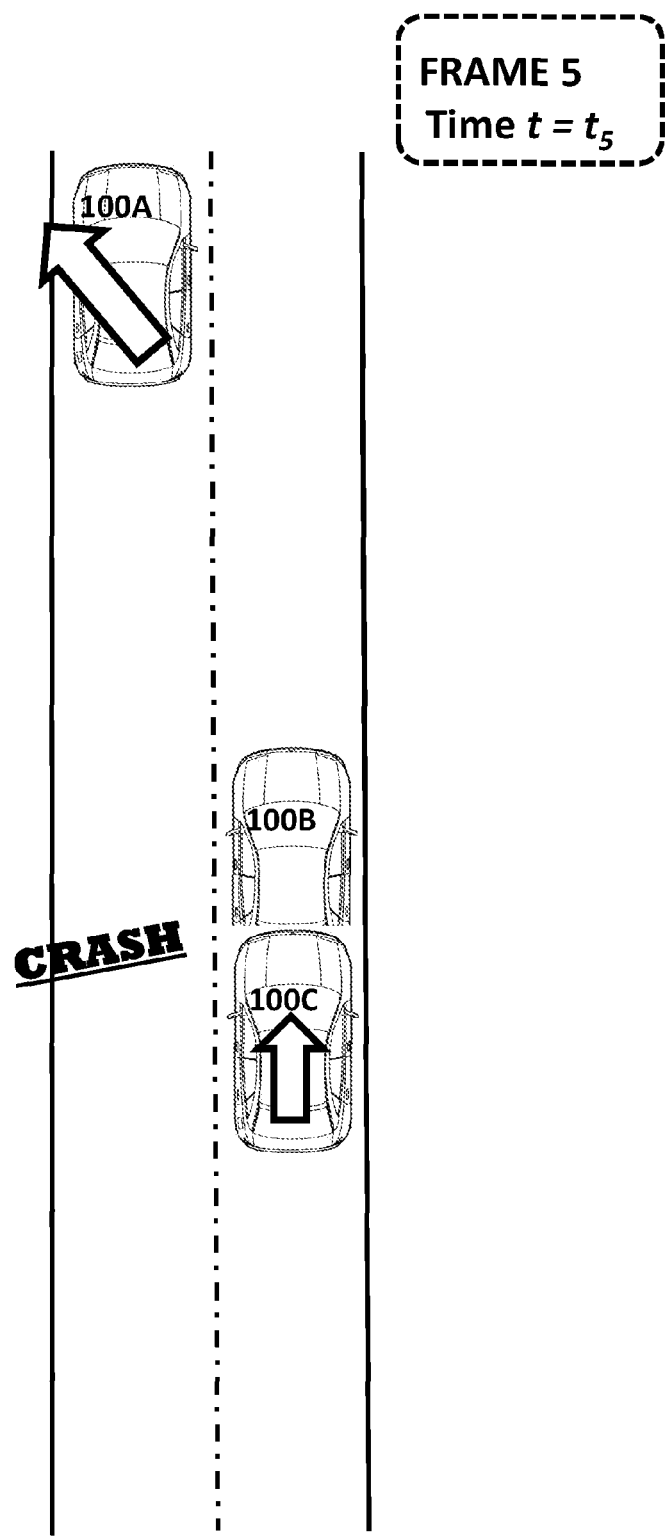

The result is illustrated in FIG. 10E where the velocity of travel of vehicle 100A changes. In particular, vehicle 100A moves into the left lane to avoid being hit from behind by vehicle 100B.

The method of FIG. 9 may be performed at any speed—in some embodiments, an elapsed time between commencement of step S201 and performance of step S213 is at most 500 milliseconds or at most 300 milliseconds or at most 100 milliseconds.

Anti-Accident Devices and Some Embodiments of the Method of FIG. 9

In some embodiments of the invention, a respective anti-accident device 200 resides (i.e. temporarily or permanently) on the first (e.g. 100B of FIGS. 10A-10E) and third (e.g. 100A of FIGS. 10A-10E) motor vehicles of the method of FIG. 9.

Each anti-accident device 200 is capable of providing all the functionality required from the first and third motor vehicles of the method of FIG. 9—the particular functionality depends on the vehicle where the anti-accident device resides.

Thus, when the anti-accident device 200 resides on the first vehicle (e.g. 100B of FIGS. 10A-10E) of the method of FIG. 9, the anti-accident device provides the following functionality: in response to a predicting (e.g. performed in step S201 of FIG. 9) by the prediction-engine of the anti-accident device residing on the first vehicle (i.e. which is the host motor-vehicle device of the first anti-accident device—e.g. 100B of FIGS. 10A-10E) that the host motor-vehicle (i.e. first vehicle—e.g. 100B of FIGS. 10A-10E) might be hit from behind by a first external motor-vehicle (i.e. the first external motor-vehicle is equivalent to the second motor vehicle of FIG. 9—e.g. 100C of FIGS. 10A-10E), the first anti-accident device (i.e. residing on the first vehicle—e.g. 100B of FIGS. 10A-10E) transmits (e.g. see step S205 of FIG. 9) an outgoing accident alert (e.g. via the wireless transmitter of the anti-accident device residing on the first vehicle).

When the anti-accident device 200 resides on the third vehicle (e.g. 100A of FIGS. 10A-10E) of the method of FIG. 9, the anti-accident device provides the following functionality: in response to a receipt of an incoming accident alert (see step S209 of FIG. 9) that: (A) is received via a wireless receiver of the anti-accident device on the third vehicle (e.g. 100A of FIGS. 10A-10E); (B) is received from a second external motor-vehicle (i.e. the second external motor-vehicle is equivalent to the first motor vehicle of FIG. 9—e.g. 100B of FIGS. 10A-10E) that is behind of the host motor-vehicle (i.e. when the anti-accident device resides on the third vehicle, the host motor-vehicle is the third vehicle—e.g. 100A of FIGS. 10A-10E); and (C). indicates that an accident might occur behind the host motor-vehicle (e.g. 100A of FIGS. 10A-10E) where the second external motor-vehicle (e.g. 100B of FIGS. 10A-10E) is hit from behind by a third external motor-vehicle (e.g. 100C of FIGS. 10A-10E), the device controller of the anti-accident device residing on the third vehicle of FIG. 9 (e.g. 100A of FIGS. 10A-10E) sends control signals to one or more onboard vehicle controls of the host motor-vehicle (e.g. 100A of FIGS. 10A-10E). In particular, the control signals are sent so as to perform at least one vehicle control action in order to avoid the host motor-vehicle (i.e. this is the third vehicle of FIG. 9—e.g. 100A of FIGS. 10A-10E) being hit from behind by the second external motor-vehicle (i.e. this is the first vehicle of FIG. 9—e.g. 100B of FIGS. 10A-10E) and/or in order to reduce damage inflicted upon the host motor-vehicle (e.g. 100A of FIGS. 10A-10E) resulting from being hit from behind by the second external motor-vehicle (i.e. this is the first vehicle of FIG. 9—e.g. 100B of FIGS. 10A-10E).

Figure 12:
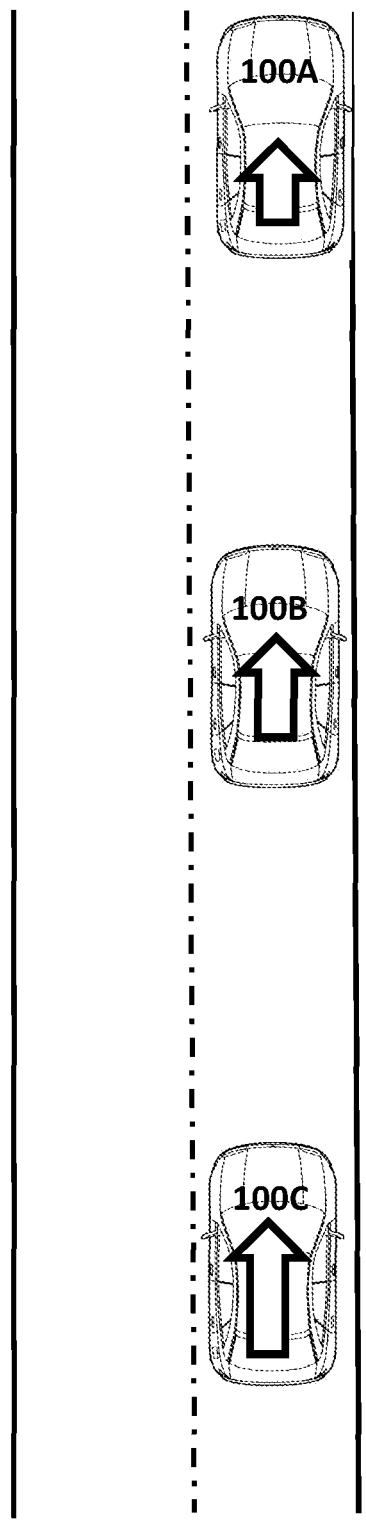

A Discussion of FIGS. 11-12

FIG. 11 is a flow chart of a method for responding to a prediction of a potential accident involving first 100B, second 100A and third 100C motor-vehicles according to some embodiments of the invention. Without limitation, the method of FIG. 11 will be explained with reference to the non-limiting example of FIGS. 12—thus, in the non-limiting example, the first motor-vehicle is vehicle 100B, the second motor-vehicle is vehicle 100A, and the third motor-vehicle is vehicle 100C.

In step S301, an accident scenario is computationally predicted by an onboard computer of the first motor-vehicle 100B, the accident scenario indicating that a first motor-vehicle accident might occur between the first 100B and second 100A motor-vehicles—e.g. where the first 100B motor-vehicle hits the second 100A motor-vehicle from behind. For example, as shown in FIG. 12, first vehicle 100B is travelling faster than second vehicle 100A.

In step S305 an onboard computer of the first 100B motor-vehicle determines if changing a velocity of the first 100B motor-vehicle (e.g. by braking sharply) in order to (i) avoid the first motor-vehicle accident (i.e. where the first 100B motor-vehicle hits the second 100A motor-vehicle from behind) and/or (ii) reduce a likelihood thereof and/or (iii) reduce a severity thereof would (i) result in a second motor-vehicle accident between the first 100B and third 100C motor-vehicles (e.g. the third 100C motor-vehicle hits the first 100B motor-vehicle from behind) and/or (ii) increases a likelihood of the second motor-vehicle accident.

In some embodiments, step S305 is performed in response to the predicting of step S301.

For example, as shown in FIG. 12, the third motor-vehicle 100C is travelling faster than the first 100B motor-vehicle. In the event that the first 100B motor-vehicle brakes sharply, this could cause the third 100C motor-vehicle to hit the first 100B motor-vehicle from behind.

In step S309, in response to a positive determining (i.e. a determining that in fact the changing of the velocity of the first motor-vehicle 100B to avoid the first motor-vehicle accident would cause the second motor-vehicle accident to occur or could increase a likelihood thereof), an onboard computer of the first motor-vehicle 100B performs at least one vehicle control action by adjusting the velocity of the first motor-vehicle 100B according to respective velocities and/or accelerations of the second 100A and third motor 100C vehicles.

The method of FIG. 11 may be performed at any speed—in some embodiments, an elapsed time between commencement of step S301 and performance of step S309 is at most 500 milliseconds or at most 300 milliseconds or at most 100 milliseconds.

Anti-Accident Devices and Some Embodiments of the Method of FIG. 11

In some embodiments of the invention, anti-accident device 200 resides (i.e. temporarily or permanently) on the first motor vehicle of the method of FIG. 11 (e.g. 100B of FIG. 12).

This anti-accident device comprises a prediction-engine 220 for processing factual input data about a plurality of motor-vehicles and computationally predicting an accident scenario indicating that a first motor vehicle accident may occur between the host motor-vehicle (i.e. the first vehicle of FIG. 11—e.g. 100B of FIG. 12) and a first external motor-vehicle (i.e. to the second motor-vehicle of FIG. 11—e.g. 100C of FIG. 12).

The prediction-engine is further operative to determine if changing a velocity of the host motor-vehicle (i.e. the first vehicle of FIG. 11—e.g. 100B of FIG. 12) in order (i) to avoid the first motor-vehicle accident and/or (ii) to reduce a likelihood thereof and/or (iii) to reduce a severity thereof, would result in one or more of: (A) a second motor-vehicle accident occurring between the host motor-vehicle (i.e. the first vehicle of FIG. 11—e.g. 100B of FIG. 12) and a second external motor-vehicle (i.e. the third vehicle of FIG. 11—e.g. 100A of FIG. 12) and (ii) an increase in a likelihood that the second motor-vehicle accident will occur.

This anti-accident device further comprises a device controller 210 for responding to a positive determining by sending control signals (e.g. wired control signals) to one or more onboard vehicle controls of the host motor-vehicle (i.e. the first vehicle of FIG. 11—e.g. 100B of FIG. 12) to adjust the velocity of the host motor-vehicle (i.e. the first vehicle of FIG. 11—e.g. 100B of FIG. 12) according to respective velocities and/or accelerations of the first external motor-vehicle (i.e. the second vehicle of FIG. 11—e.g. 100C of FIG. 12) and the second external motor-vehicle (i.e. the third vehicle of FIG. 11—e.g. 100A of FIG. 12).

Additional Discussion

In the current section, vehicle 100A is referred to as car A, vehicle 100B is referred to as car B, vehicle 100C is referred to as car C, vehicle 100D is referred to as car D. In the present example, it is assumed that car B follows car A, car C follows car B and car D follows car C, as illustrated in FIG. 1

A first method is disclosed that is most useful in managing driverless cars driving in a convoy, but may also be used for cars driving in configurations other than a convoy and for human-driven cars. The method is about sending an accident alert by one car to another car in response to being alerted by yet another car. The method comprises the following steps:
   a. transmitting, by a first car, a first accident alert;
   b. receiving the first accident alert by a second car;
   c. In response to the receiving of the first accident alert, transmitting a second accident alert by the second car;
   d. receiving the second accident alert by a third car;
   e. In response to the receiving of the second accident alert, attempting to avoid a car accident by the third car.

The first accident alert may comprise an indication that the first car is braking. This corresponds for example to a case where the first car is car B, the second car is car C, car B brakes and the first accident alert is sent by car B and received by car C.

The first accident alert may comprise an indication that the first car is decelerating. This corresponds for example to a case where the first car is car B, the second car is car C, car B decelerates and the first accident alert is sent by car B and received by car C.

The first accident alert may comprise an indication that the first car is accelerating. This corresponds for example to a case where the first car is car C, the second car is car B, car C accelerates and the first accident alert is sent by car C and received by car B.

The first accident alert may comprise an indication of an action by a fourth car. This corresponds for example to a case where the first car is car C, the second car is car B, the fourth car is car D, car D accelerates and the first accident alert is sent by car C and received by car B.

The first accident alert may comprise an indication that a car accident might occur between the first car and the second car. By an "alert comprising an indication that a car accident might occur" it is meant (here and in all other places this term is used in this disclosure) that an alert includes an explicit indication of the fact that an accident might occur, with or without an identification of a root cause for the accident (such as braking, decelerating or accelerating by a car). This corresponds for example to a case where the first car is car C, the second car is car B, car C accelerates and the first accident alert is sent by car C and received by car B.

The first accident alert may comprise an indication that a car accident might occur between the first car and a fourth car. This corresponds for example to a case where the first car is car C, the second car is car B, the fourth car is car D, car D accelerates and the first accident alert is sent by car C and received by car B.

The second accident alert may comprise an indication that the first car is braking. This corresponds for example to a case where the first car is car B, the second car is car C, the third car is car D, car B brakes, the first accident alert is sent by car B and received by car C and the second accident alert is sent by car C and received by car D.

The second accident alert may comprise an indication that the first car is decelerating. This corresponds for example to a case where the first car is car B, the second car is car C, the third car is car D, car B decelerates, the first accident alert is sent by car B and received by car C and the second accident alert is sent by car C and received by car D.

The second accident alert may comprise an indication that the first car is accelerating. This corresponds for example to a case where the first car is car C, the second car is car B, the third car is car A, car C accelerates, the first accident alert is sent by car C and received by car B and the second accident alert is sent by car B and received by car A.

The second accident alert may comprise an indication of an action by a fourth car. This corresponds for example to a case where the first car is car C, the second car is car B, the third car is car A, the fourth car is car D, car D accelerates, the first accident alert is sent by car C and received by car B and the second accident alert is sent by car B and received by car A.

The second accident alert may comprise an indication that a car accident might occur between the first car and the second car. This corresponds for example to a case where the first car is car C, the second car is car B, the third car is car A, car C accelerates, the first accident alert is sent by car C and received by car B and the second accident alert is sent by car B and received by car A.

The second accident alert may comprise an indication that a car accident might occur between the first car and a fourth car. This corresponds for example to a case where the first car is car C, the second car is car B, the third car is car A, the fourth car is car D, car D accelerates, the first accident alert is sent by car C and received by car B and the second accident alert is sent by car B and received by car A.

The second car may follow the first car and the third car may follow the second car. This corresponds for example to a case where the first car is car B, the second car is car C, the third car is car D, car B brakes, the first accident alert is sent by car B and received by car C and the second accident alert is sent by car C and received by car D.

Alternatively, the second car may follow the third car and the first car may follow the second car. This corresponds for example to a case where the first car is car C, the second car is car B, the third car is car A, car C accelerates, the first accident alert is sent by car C and received by car B and the second accident alert is sent by car B and received by car A.

The attempting to avoid a car accident may comprise braking by the third car. This corresponds for example to a case where the first car is car B, the second car is car C, the third car is car D, car B brakes, the first accident alert is sent by car B and received by car C, the second accident alert is sent by car C and received by car D and car D brakes in an attempt to avoid hitting car C.

The attempting to avoid a car accident may comprise decelerating by the third car. This corresponds for example to a case where the first car is car B, the second car is car C, the third car is car D, car B brakes, the first accident alert is sent by car B and received by car C, the second accident alert is sent by car C and received by car D and car D decelerates in an attempt to avoid hitting car C.

The attempting to avoid a car accident may comprise accelerating by the third car. This corresponds for example to a case where the first car is car C, the second car is car B, the third car is car A, car C accelerates, the first accident alert is sent by car C and received by car B, the second accident alert is sent by car B and received by car A and car A accelerates in an attempt to avoid being hit by car B.

A second method is disclosed that is most useful in managing driverless cars driving in a convoy, but may also be used for cars driving in configurations other than a convoy and for human-driven cars. The method is about alerting a car in front of us that we are about to be hit from behind. The method comprises the following steps:
   a. determining, by a first car, that a car accident might occur between the first car and a second car with the second car hitting the first car from behind;
   b. transmitting, by the first car, an accident alert;

c. receiving the accident alert by a third car which is in front of the first car;

d. in response to the receiving of the accident alert, attempting to avoid a car accident by the third car.

This method corresponds for example to a case where the first car is car B, the second car is car C, the third car is car A, car C accelerates, the accident alert is sent by car B and received by car A and car A attempts to avoid being hit by car B.

The accident alert may comprise an indication that the first car might be hit by the second car from behind.

The accident alert may comprise an indication that a car accident might occur between the first car and the third car.

The attempting to avoid a car accident may comprise accelerating by the third car.

A third method is disclosed that is most useful in managing driverless cars driving in a convoy, but may also be used for cars driving in configurations other than a convoy and for human-driven cars. The method is about adjusting car speed for minimizing damage when being hit from behind and hitting another car in the front. The method comprises the following steps:

a. determining, by a first car, that a first car accident might occur between the first car and a second car;

b. determining, by the first car, that changing its speed in order to avoid the first car accident with the second car would result in the first car having a second car accident with a third car;

c. in response to the determining, adjusting the speed of the first car according to the speed of the second car and according to the speed of the third car.

The adjusted speed of the first car may be selected so as to reduce the amount of an overall damage suffered by the first car from the first car accident and the second car accident.

The first car may follow the second car and the third car may follow the first car. This corresponds for example to a case where the first car is car C, the second car is car B, the third car is car D, car B decelerates and car C adjusts its speed.

Alternatively, the first car may follow the third car and the second car may follow the first car. This corresponds for example to a case where the first car is car C, the second car is car D, the third car is car B, car D accelerates and car C adjusts its speed.

The following United States patent are incorporated herein by reference in their entirety: U.S. Pat. Nos. 5,262,016, 7,098,781, 7,202,776, 7,859,392, 8,031,062, 8,305,936, 8,321,092, 8,428,863, 8,437,890, 8,457,877, 8,543,261, 8,552,886, 8,552,886, 8,583,358, 8,589,062, 8,618,922, 8,630,768, 8,660,734, 8,744,648, 8,744,666, 8,880,273, 8,882,560, 8,890,717, 8,935,034, 8,941,510, 8,948,955, 8,954,205, 8,976,040, 9,067,145, 9,067,565, 9,104,965, 9,110,169, 9,142,127, 9,182,942, 9,207,679, 9,216,737, and 9,308,919.

The following United States published patent applications are incorporated herein by reference in their entirety: US patent publication 20010032236, US patent publication 20020146347, US patent publication 20030139867, US patent publication 20050134440, US patent publication 20060287783, US patent publication 20070080825, US patent publication 20070112514, US patent publication 20080062011, US patent publication 20080172177, US patent publication 20080212840, US patent publication 20080231835, US patent publication 20080255722, US patent publication 20080258890, US patent publication 20080262670, US patent publication 20080291051, US patent publication 20080294690, US patent publication 20090051510, US patent publication 20090073034, US patent publication 20090125174, US patent publication 20090174573, US patent publication 20090315693, US patent publication 20100106356, US patent publication 20100164701, US patent publication 20100253593, US patent publication 20100263954, US patent publication 20100269920, US patent publication 20120022689, US patent publication 20120035788, US patent publication 20120072067, US patent publication 20120081218, US patent publication 20120101680, US patent publication 20120109610, US patent publication 20120126997, US patent publication 20120249341, US patent publication 20120265418, US patent publication 20120316725, US patent publication 20130016027, US patent publication 20130017346, US patent publication 20130018526, US patent publication 20130018528, US patent publication 20130018766, US patent publication 20130030657, US patent publication 20130041576, US patent publication 20130066511, US patent publication 20130151058, US patent publication 20130162479, US patent publication 20130211657, US patent publication 20130222127, US patent publication 20130229289, US patent publication 20130231824, US patent publication 20130238181, US patent publication 20130261869, US patent publication 20130267194, US patent publication 20130274986, US patent publication 20130321627, US patent publication 20130325202, US patent publication 20130327244, US patent publication 20140005875, US patent publication 20140032017, US patent publication 20140032017, US patent publication 20140032093, US patent publication 20140039676, US patent publication 20140058611, US patent publication 20140129075, US patent publication 20140136414, US patent publication 20140142799, US patent publication 20140142830, US patent publication 20140142868, US patent publication 20140145838, US patent publication 20140156068, US patent publication 20140172226, US patent publication 20140214259, US patent publication 20140218482, US patent publication 20140222278, US patent publication 20140249741, US patent publication 20140303870, US patent publication 20140327775, US patent publication 20140358324, US patent publication 20150025731, US patent publication 20150032372, US patent publication 20150039214, US patent publication 20150042491, US patent publication 20150081156, US patent publication 20150081188, US patent publication 20150112571, US patent publication 20150149088, US patent publication 20150158469, US patent publication 20150158587, US patent publication 20150160653, US patent publication 20150161894, US patent publication 20150175271, US patent publication 20150202939, US patent publication 20150232272, US patent publication 20150251664, US patent publication 20150258954, US patent publication 20150261769, US patent publication 20150266477, US patent publication 20150273697, US patent publication 20150284010, US patent publication 20150314745, US patent publication 20150331113, US patent publication 20150332407, US patent publication 20150334545, US patent publication 20150363986, US patent publication 20150369832, US patent publication 20160001720, US patent publication 20160028824, US patent publication 20160035221, US patent publication 20160054735, US patent publication 20160059855, US patent publication 20160096531, and US patent publication 20160117871.

All references cited herein are incorporated by reference in their entirety. Citation of a reference does not constitute an admission that the reference is prior art.

It is further noted that any of the embodiments described above may further include receiving, sending or storing instructions and/or data that implement the operations described above in conjunction with the figures upon a computer readable medium. Generally speaking, a computer readable medium (e.g. non-transitory medium) may include storage media or memory media such as magnetic or flash or optical media, e.g. disk or CD-ROM, volatile or non-volatile media such as RAM, ROM, etc.

Having thus described the foregoing exemplary embodiments it will be apparent to those skilled in the art that various equivalents, alterations, modifications, and improvements thereof are possible without departing from the scope and spirit of the claims as hereafter recited. In particular, different embodiments may include combinations of features other than those described herein. Accordingly, the claims are not limited to the foregoing discussion.

What is claimed is:

1. An anti-accident device for operation onboard a host motor-vehicle, the anti-accident device comprising:
   a. a prediction-engine for processing factual input data about a plurality of motor-vehicles and computationally predicting future occurrences of motor-vehicle accidents as well as one or more parameters of the motor-vehicle accidents that are predicted to occur;
   b. a wireless transmitter for wireles sly transmitting non-visual electromagnetic (EM) signals;
   c. a wireless receiver for wirelessly receiving non-visual EM signals; and
   d. a device controller for sending control signals to onboard vehicle controls of the host motor-vehicle where the anti-accident device resides,
   wherein the anti-accident onboard device provides the following features:
      i. in response to a computed prediction by the prediction-engine that a first motor-vehicle accident will occur, where the host motor-vehicle will be hit from behind by a first external motor-vehicle, the device controller transmits an outgoing accident alert via the wireless transmitter where the outgoing accident alert comprises:
         A. the prediction that the first motor-vehicle accident will occur as computed by the prediction-engine; and
         B. one or more computationally predicted parameters of the first motor-vehicle accident that is predicted to occur as computed by the prediction-engine; and
      ii. in response to an incoming accident alert that:
         A. is received via the wireless receiver;
         B. is received from a second external motor-vehicle that is behind of the host motor-vehicle;
         C. indicates that a second motor-vehicle accident will occur behind the host motor-vehicle where the second external motor-vehicle is hit from behind by a third external motor-vehicle; and
         D. includes one or more parameters of the second motor-vehicle accident,
      the device controller sends control signals to one or more onboard vehicle controls of the host motor-vehicle to perform at least one vehicle control action so as to attempt at least one of the following:
         A. avoiding the host motor-vehicle being hit from behind by the second external motor-vehicle; and
         B. reducing damage inflicted upon the host motor-vehicle resulting from being hit from behind by the second external motor-vehicle.

2. The anti-accident device of claim 1 wherein the outgoing accident alert transmitted via the wireless transmitter of the host motor-vehicle comprises an indication that the host motor-vehicle will be hit from behind by the first external motor-vehicle.

3. The anti-accident device of claim 1 wherein the outgoing accident alert transmitted via the wireless transmitter of the host motor-vehicle comprises an indication that an accident may occur between the host motor-vehicle and a fourth external motor-vehicle.

4. The anti-accident device of claim 1 wherein the at least one vehicle control action includes a vehicle control action that causes accelerating of the host motor-vehicle.

5. The anti-accident device of claim 4 wherein the vehicle control action that causes accelerating of the host motor-vehicle attempts to avoid being hit from behind by the second external motor-vehicle.

6. The anti-accident device of claim 4 wherein the vehicle control action that causes accelerating of the host motor-vehicle attempts to reduce damage inflicted upon the host motor-vehicle resulting from being hit from behind by the second external motor-vehicle.

7. An anti-accident system comprising:
   a plurality of anti-accident devices, each given anti-accident device of the plurality respectively comprising:
      a. a respective prediction-engine for processing factual input data about a plurality of motor-vehicles and computationally predicting future occurrences of motor-vehicle accidents as well as one or more parameters of the motor-vehicle accidents that are predicted to occur;
      b. a respective wireless transmitter for wirelessly transmitting non- visual electromagnetic (EM) signals;
      c. a respective wireless receiver for wirelessly receiving non-visual EM signals; and
      d. a respective device controller for sending control signals to onboard vehicle controls of a respective host motor-vehicle where the given anti-accident device resides,
   wherein the plurality of anti-accident devices comprises first and second anti-accident devices such that, when:
      i. first, second and third motor-vehicles are arranged relative to each other so that the second motor-vehicle is behind the first motor-vehicle and the first motor-vehicle is behind the third motor-vehicle; and
      ii. the first anti-accident device resides in the first motor-vehicle and the second anti-accident device resides in the third motor-vehicle,
   the first and second anti-accident devices perform the following operations:
      A. in response to a prediction-engine of the first anti-accident device computationally predicting that a specific motor-vehicle accident will occur where the first motor-vehicle will be hit from behind by the second motor-vehicle along with one or more parameters of the specific motor-vehicle accident that is predicted to occur, a wireless transmitter of the first anti-accident device wirelessly transmits, by non-visual EM radiation and from the first motor-vehicle, an accident alert comprising the prediction that the specific motor-vehicle accident will occur and the predicted one or more parameters of the specific motor-vehicle accident; and B. in response to a wireless receiving of the accident alert by the second anti-accident device on the third motor-vehicle which is in front of the first motor-vehicle, the second anti-accident device performs at least one vehicle control action at the third motor-vehicle so as to attempt at least one of the following (i) avoiding being hit from behind by the first motor-vehicle and (ii) reducing damage inflicted upon the third motor-vehicle resulting from being hit from behind by the first motor-vehicle.

8. The anti-accident system of claim 7 wherein the accident alert transmitted by the wireless transmitter of the first motor-vehicle comprises an indication that the first motor-vehicle will be hit from behind by the second motor-vehicle.

9. The anti-accident system of claim 7 wherein the accident alert transmitted by the wireless transmitter of the first motor-vehicle comprises an indication that an accident may occur between the first and third motor-vehicles.

10. The anti-accident system of claim 7 wherein the at least one vehicle control action includes a vehicle control action that causes accelerating of the third motor-vehicle.

11. The anti-accident system of claim 10 wherein the vehicle control action that causes accelerating of the third motor-vehicle attempts to avoid being hit from behind by the first motor-vehicle.

12. The anti-accident system of claim 10 wherein the vehicle control action that causes accelerating of the third motor-vehicle attempts to reduce damage inflicted upon the third motor-vehicle resulting from being hit from behind by the first motor-vehicle.

\* \* \* \* \*

UNITED STATES PATENT AND TRADEMARK OFFICE
CERTIFICATE OF CORRECTION

| | | |
|---|---|---|
| PATENT NO. | : 9,841,762 B2 | Page 1 of 1 |
| APPLICATION NO. | : 15/464015 | |
| DATED | : December 12, 2017 | |
| INVENTOR(S) | : Dov Moran and Menahem Lasser | |

It is certified that error appears in the above-identified patent and that said Letters Patent is hereby corrected as shown below:

On the Title Page

Item (73) Assignee, Line 1 -- remove the entire field/item to indicate that there is no Assignee Signed and Sealed this
Seventeenth Day of April, 2018

Andrei Iancu
*Director of the United States Patent and Trademark Office*